United States Patent
Inti et al.

(10) Patent No.: US 12,003,400 B1
(45) Date of Patent: Jun. 4, 2024

(54) PRESENCE DETECTION BASED ON LINK PARAMETER DATA AND NETWORK PARAMETER DATA

(71) Applicant: Amazon Technologies, Inc., Seattle, WA (US)

(72) Inventors: Durga Laxmi Narayana Swamy Inti, Kakinada (IN); Kun Ting Tsai, Fremont, CA (US); Ravi Ichapurapu, Morgan Hill, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/983,275

(22) Filed: Nov. 8, 2022

Related U.S. Application Data

(63) Continuation of application No. 17/073,055, filed on Oct. 16, 2020, now Pat. No. 11,539,610, which is a continuation-in-part of application No. 17/002,328, filed on Aug. 25, 2020, now Pat. No. 11,483,046.

(51) Int. Cl.
*H04W 80/02* (2009.01)
*H04B 7/06* (2006.01)
*H04B 17/318* (2015.01)
*H04L 43/16* (2022.01)
*H04W 24/08* (2009.01)
*H04W 24/10* (2009.01)

(52) U.S. Cl.
CPC .......... *H04L 43/16* (2013.01); *H04B 7/0626* (2013.01); *H04B 17/318* (2015.01); *H04W 24/08* (2013.01); *H04W 24/10* (2013.01)

(58) Field of Classification Search
CPC ..... H04L 43/16; H04B 7/0626; H04B 17/318; H04W 24/08
See application file for complete search history.

(56) References Cited

U.S. PATENT DOCUMENTS

| | | | |
|---|---|---|---|
| 10,217,346 | B1 | 2/2019 | Zhang et al. |
| 10,305,766 | B1 | 5/2019 | Zhang et al. |
| 10,798,529 | B1 | 10/2020 | Beg et al. |
| 10,846,716 | B1 | 11/2020 | Chow et al. |
| 10,966,121 | B1 | 3/2021 | Pandit et al. |
| 11,050,788 | B2 | 6/2021 | Livanos |

(Continued)

OTHER PUBLICATIONS

U.S. Appl. No. 17/002,328, "Corrected Notice of Allowability," dated Aug. 26, 2022, 2 pages.

(Continued)

*Primary Examiner* — Fahmida S Chowdhury
(74) *Attorney, Agent, or Firm* — Kilpatrick Townsend & Stockton LLP

(57) ABSTRACT

Techniques for presence detection are described. In an example, system receives, from a first device connected with a computer network that is associated with a location, a first value of a first parameter associated with a link between the first device and a second device. The system determines, using a first prediction model and the first value, a first likelihood of presence at the location. The first prediction model is configured based at least in part on outputs of a second prediction model that uses a second parameter associated with the computer network. The system determines whether the presence is detected at the location based at least in part on the first likelihood.

20 Claims, 24 Drawing Sheets

(56) References Cited

U.S. PATENT DOCUMENTS

| | | |
|---|---|---|
| 11,372,086 B2 | 6/2022 | Sambhwani et al. |
| 2009/0097395 A1 | 4/2009 | Zhang et al. |
| 2012/0134275 A1 | 5/2012 | Choi et al. |
| 2013/0051275 A1 | 2/2013 | Kim et al. |
| 2013/0091212 A1 | 4/2013 | Rajakarunanayake |
| 2013/0223229 A1* | 8/2013 | Hui ................... H04W 40/02 370/238 |
| 2017/0273109 A1* | 9/2017 | Babaei ................ H04W 52/42 |
| 2019/0020721 A1 | 1/2019 | Chun et al. |
| 2019/0053084 A1* | 2/2019 | Hosseini .............. H04L 5/0094 |
| 2019/0349849 A1* | 11/2019 | Kavuri ............ H04W 36/0022 |
| 2020/0207474 A1 | 7/2020 | Foggia et al. |
| 2020/0267530 A1 | 8/2020 | Bartolome Rodrigo et al. |
| 2021/0146963 A1 | 5/2021 | Li et al. |
| 2021/0191407 A1 | 6/2021 | Benisch et al. |
| 2021/0195260 A1* | 6/2021 | Major ................. H04N 21/812 |
| 2021/0227374 A1 | 7/2021 | Rodrigo et al. |
| 2021/0306043 A1* | 9/2021 | Damnjanovic ... H04W 72/0446 |
| 2021/0314796 A1* | 10/2021 | Hoang ................ H04W 52/36 |
| 2021/0368287 A1* | 11/2021 | Chen ................... H04B 17/318 |
| 2021/0390004 A1 | 12/2021 | Kundu et al. |
| 2021/0390426 A1 | 12/2021 | Nair |
| 2022/0018982 A1 | 1/2022 | Rueger et al. |
| 2022/0019810 A1 | 1/2022 | Farber et al. |
| 2022/0060792 A1 | 2/2022 | Kim et al. |
| 2022/0083782 A1 | 3/2022 | Qian et al. |
| 2023/0155653 A1* | 5/2023 | Hao .................... H04B 7/0626 370/252 |

OTHER PUBLICATIONS

U.S. Appl. No. 17/002,328, "Non-Final Office Action," dated Jan. 14, 2022, 12 pages.

U.S. Appl. No. 17/002,328, "Notice of Allowance," dated Jun. 13, 2022, 10 pages.

U.S. App. No. 17/073, 055, "Non-Final Office Action," dated Apr. 25, 2022, 12 pages.

U.S. Appl. No. 17/073,055, "Notice of Allowance," dated Aug. 12, 2022, 11 pages.

\* cited by examiner

PRESENCE DETECTION BASED ON LINK PARAMETER DATA AND NETWORK PARAMETER DATA

CROSS-REFERENCE TO RELATED APPLICATIONS

This application is a continuation of U.S. patent application Ser. No. 17/073,055, filed Oct. 16, 2020, and entitled "PRESENCE DETECTION BASED ON LINK PARAMETER DATA AND NETWORK PARAMETER DATA," which is a continuation-in-part of U.S. patent application Ser. No. 17/002,328, filed Aug. 25, 2020, issued to U.S. Pat. No. 11,483,046 on Oct. 25, 2022, and entitled "CHANNEL STATE INFORMATION (CSI) PACKET TRANSMISSION BASED ON A DYNAMIC TRANSMISSION PERIOD," the contents of all of which are hereby incorporated by reference in their entireties for all purposes.

BACKGROUND

Various types of computer networks are available to connect devices. For example, a wireless local area network (WLAN) links multiple devices using wireless communication to form a local area network within a limited area such as a home or office building. A mesh network is an example of another local computer network in which devices can connect wirelessly, directly and dynamically by forming non-hierarchal computing nodes. The various types of computer networks enable the connected devices to transmit traffic data, such as data generated and exchanged between applications executing on the devices. Additional computing services are possible, such as the transmission of channel state information (CSI) describing signal propagation between devices and making it possible to adapt data transmissions to channel conditions.

BRIEF DESCRIPTION OF THE DRAWINGS

Various embodiments in accordance with the present disclosure will be described with reference to the drawings, in which.

DETAILED DESCRIPTION

Figure 1:
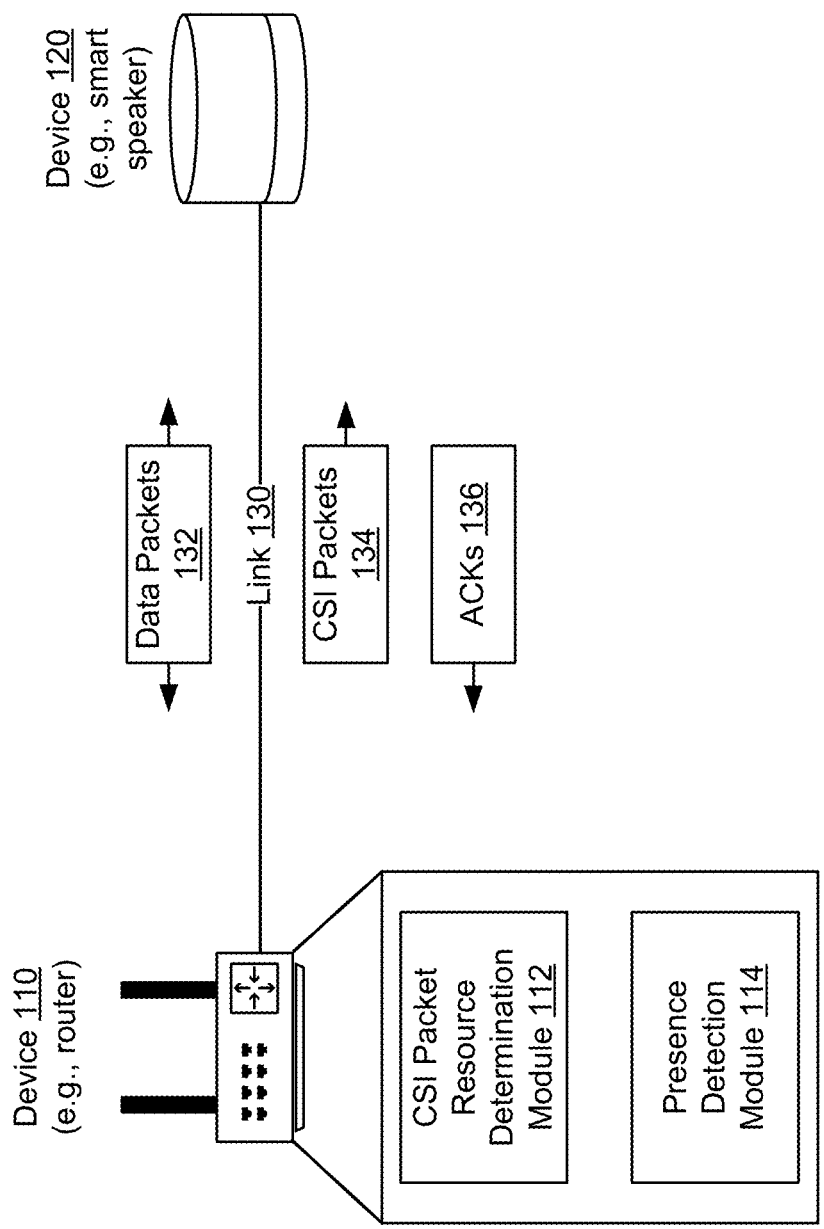
FIG. 1 illustrates an example of dynamic CSI packet transmission between devices, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure also relate to performing presence detection. In an example, first data indicating a first value of a network parameter (e.g., a first received signal strength indicator (RSSI) value) and a second value of a link parameter (e.g., a first CSI value) is received from one more devices installed at a location. The first value is usable in determining a first prediction about presence at the location (e.g., a first likelihood of the presence) with a first prediction model. The second value is usable in determining a second prediction about the presence (e.g., a second likelihood of the presence) with a second prediction model. The first prediction is associated with a first confidence value and the second prediction is associated with a second confidence value. A first weight is determined by comparing the first confidence value to a first threshold value and a second weight is determined by comparing the second confidence value to a second threshold. The first confidence value is weighed according to the first weight to generate a first weighted confidence value. Similarly, the second confidence value is weighed according to the second weight to generate a second weighted decision. The two weighted confidence values are combined to generate a weighted confidence value. This weighted confidence value is compared to a third threshold value to generated a decision about the presence detection. If any of the network parameter or the link parameter is associated with a high confidence value, refinements to one or both of the models can be made (e.g., through a feedback loop or additional training). For instance, if the network parameter is associated a high confidence value, its first value can be added to a training dataset and used as ground truth in the training of the second prediction model. Conversely, if the link parameter is associated with a high confidence value, its second value can be added to feedback data, where the feedback data changes one or more settings of the first prediction model.

To illustrate, consider an example of a mesh network that includes multiple nodes, such as routers distributed within a home. Mobile devices can connect to the mesh network at various times. Network parameter data and link parameter data about the devices connected to the network can be received by a computer system. The computer system determines a first prediction by inputting the network parameter data to a metrics-based model. A second prediction is determined by inputting the link parameter data into a machine-learning (ML) model that is a neural network. Each of the predictions is associated with confidence value usable to derive weights. When both models indicate presence, the computer system outputs a decision that the presence is detected. Similarly, when both models indicate no presence, the computer system outputs a decision that no presence is detected. However, when the models output opposite predictions (e.g., one model indicates the presence, while the other model indicates no presence), a weighted decision is made by weighing the outputs of each models and comparing the weighted result to a threshold. For instance, the metrics-based model outputs that the presence is detected with a ninety-five percent confidence value. In comparison, the ML model outputs that no presence is detected with a thirty percent confidence value. These two confidence values are compared to thresholds to determine weights. Based on the comparisons, the weight of the first prediction is set to 0.8, whereas the weight of the second prediction is set to 0.2. The confidence value determined by the metrics-based model is adjusted to 0.95×0.8=0.76 (or seventy-six percent). Similarly, the confidence value determined by the ML model is adjusted to 0.3×0.2=0.06 (or six percent). The two adjusted confidence values are combined, resulting in a confidence level of 0.76−0.06=0.70 (or seventy percent). This seventy percent confidence value is compared to a threshold value (e.g., sixty-five percent). Because the confidence value exceeds this threshold value, a determination is made that the presence is detected. In addition, when the first prediction has a high confidence value, whereas the second prediction has a confidence value lower than a predefined threshold value, a training label is generated and includes the first prediction (e.g., that the presence is detected). The training label is added is added to a training dataset, along with the link parameter data and the training dataset is used to further train the ML model.

Embodiments of the present disclosure provide various technological improvements. For example, the training of the ML model need not be intrusive to users by necessitating users to provide particular training data under particular conditions. Instead, additional training data is generated over time, including ground truth labels, based on collected link parameter data and predictions of the metrics-based model. Further, the use of a weighted decision can improve the overall accuracy of the presence detection.

In the interest of clarity of explanation, various embodiments of the present disclosure are described in connection with using CSI packets for presence detection. However, the embodiments of the present disclosure are not limited as such. Instead, the embodiments similarly apply to any computing service that relies on CSI.

Furthermore, various embodiments are described with dynamically changing the CSI packet period based on link parameters. The embodiments similarly apply to dynamically changing other resources usable for transmitting CSI packets. For instance, the transmission bandwidth and/or the number of transmit and receive antennas can be similarly changed based on the same link parameters and/or other link parameters. In an example, the transmission bandwidth can be adjusted between 20 MHz, 40 MHz, and 80 MHz and/or the number of transmit and receive antennas can be varied between one, two, four, or six antennas such that the transmission of CSI packets does not impact or minimally impacts the quality of service associated with the transmission of data packets (e.g., audio packets) between devices.

FIG. 1 illustrates an example of dynamic CSI packet transmission between devices, according to embodiments of the present disclosure. A first device 110 and a second device 120 are illustrated. Nonetheless, the embodiments of the present disclosure similarly apply to a larger number of connected devices. A link 130 exists between the first device 110 and the second device 120 and is used to transmit data packets 132, CSI packets 134, and acknowledgements (ACKs) 136.

Generally, the link 130 represents a connection between a media access control (MAC) address of a radio of the first device 110 and a MAC address of a radio of the second device 120 over a frequency channel. The link 130 can support one or more communications protocols, such as a Wi-Fi communication protocol.

FIG. 1 illustrates the first device 110 as a router. However, the embodiments of the present disclosure are not limited as such and similarly apply to any device type. Generally, the first device 110 represents a computing device that is capable of communicating with the second device 120 over the link 130. In particular, the first device 110 includes one or more processors, one or more memories storing computer-readable instructions, one or more radios, one or more network interfaces, and/or other computing components. For instance, the first device 110 can be any of a router, an access point, a mobile device, a smart speaker, a multimedia device, an Internet of Things (IoT) device, or any other type of suitable computing device.

FIG. 1 also illustrates the second device 120 as a smart speaker. However, the embodiments of the present disclosure are not limited as such and similarly apply to any device type. Additionally, the second device 120 can be of the same type as the first device 110. Generally, the second device 120 represents a computing device that is capable of communicating with the first device 110 over the link 130. In particular, the second device 120 includes one or more processors, one or more memories storing computer-readable instructions, one or more radios, one or more network interfaces, and/or other computing components. For instance, the second device 120 can be any of a router, an access point, a mobile device, a smart speaker, a multimedia device, an IoT device, or any other type of suitable computing device.

The first device 110 and the second device 120 form or belong to a computer network that includes two or more devices, such as WLAN or a mesh network. The two devices 110 can also, but need not, be connected in a peer-to-peer connection and/or can, but need not be, in a line of sight (LOS) relative to each other.

Each of the two devices 110 and 120 can execute one or more applications, resulting in application data. The application data can be transmitted from one device to the other one or between the two devices in the data packets 132 over the link 130 according to the communication protocol. In addition, the first device 110 can transmit the CSI packets 134 to second device 120 over the link 130 (additionally or alternatively, CSI packets can be transmitted in the opposite direction over the link 130). Upon receiving a CSI packet, the second device 120 can respond with an acknowledgment (ACK) transmitted over the link 130 to the first device 110 (illustrated in FIG. 1 as ACKs 136 transmitted in response to the CSI packets 134).

The first device 110 (and similarly the second device 110) can include multiple computing modules, each implemented in hardware and/or software executing on hardware. The computing modules include a CSI packet resource determination module 112 and a presence detection module 114.

In an example, the CSI packet resource determination module 112 determines conditions associated with link parameters, such as the current congestion, transmission time, reception, and/or packet error rate of the link 130 and/or the number of devices with which the first device 110 is connected. Based on these conditions, the CSI packet resource determination module 112 determines and adjusts one or more CSI packet transmission resources, such as a CSI packet period for the transmission of the CSI packets 134 over the link 130. The CSI packet period can indicate how often the device can transmit a CSI packet between the devices over the link. Generally, the conditions can change for various reasons including, for instance, the amount and/or transmission rate of the data packets 132. The higher the busyness of the link 130 and/or the device 110 as indicated by the conditions, the longer the CSI packet period becomes. In this way, when the conditions indicate, for instance, a high data transmission rate, the CSI packet transmission rate can be reduced by increasing the CSI packet period to minimize or avoid disruption or interference with the transmission of the data packets 132. Conversely, when the conditions indicate, for instance, a low data transmission rate or no data transmission, the CSI packet transmission rate can be increased because such disruption or interference would not exist.

Other resources for the transmission of CSI packets 134 can be similarly adjusted. For instance, the bandwidth, and/or number of antennas used in the transmission can be set depending on the same parameters (e.g., congestion, transmission time, reception, packet error rate, and/or number of connected devices) and/or other parameters (signal to noise ratio, battery level). Here also, depending on changes to the conditions, such resources can be adjusted. For instance, the higher the busyness of the link 130 and/or the device 110, the lower the signal to noise ratio, and/or the lower the battery level of the device 110 as indicated by the conditions, the smaller the bandwidth and/or the smaller the number of antenna become.

The parameters and the conditions that CSI packet resource determination module 112 is to analyze can be defined in a data structure, as further illustrated in connection with the next figures. The data structure can be pre-stored by the device 110 (e.g., as part of device production or upon a first power on). Additionally or alternatively, the data structure and/or any updates thereto can be received from a server.

In an example, the presence detection module 114 uses CSI-related measurements to detect objects in the vicinity of the presence detection module 114 and, thereby, detect presences. The CSI-related measurements can be performed based on the ACKs 136. For instance, measurements at the physical layer of the signals encoding the ACKs are performed and include, propagation time delays, arrival angles, signal strengths, and the like. Changes in the measurements can indicate a motion of an object in vicinity of the device 110. Generally, the higher the CSI packet transmission rate is (e.g., corresponding to a shorter CSI packet period), the higher the ACK transmission rate is, and, in turn, the higher the frequency and resolution of the CSI-related measurements are, allowing a higher level of presence detection sensitivity.

To illustrate, the first device 110 is a router located in a room and the second device 120 is a smart speaker also located in the room. Audio can be streamed from a remote audio source to the smart speaker via the router. When no audio stream exists, the CSI packet transmission rate can be maximized, resulting in the highest presence detection sensitivity. In this way, objects moving in the room can be detected with high precision and the type of the object can be recognized (e.g., human, pet, etc.). When an audio stream exists at a first audio resolution, the CSI packet transmission rate can be reduced. As a result, the presence detection sensitivity can be reduced to detecting the object, but, for example, not recognizing the type of the object. Yet, when an audio stream exists at a much higher audio resolution, the CSI packet transmission rate can be further reduced. As a result, the presence detection sensitivity can be reduced to detecting the object when in proximity to the smart speaker and/or the router.

In the interest of clarity of explanation, various embodiments are described in connection with adjusting the CSI packet period. However, the embodiments similarly apply to adjusting other resources for the transmission of CSI packets including, for instance, bandwidth and number of antennas. As further described in the next figures, plan data and periodicity data can be received from a server and used by a device to determine a CSI packet period per link. In an example, the determination involves using decision trees, each corresponding to a link parameter and indicating a CSI packet period. Similarly, the device can receive plan data and resource data indicating conditions for parameters that need to be met to select a particular configuration of a resource (e.g., a particular bandwidth, such as 20, 40, or 80 MHz, or a particular number of antennas, such as one, two, four, or six). The device can also use decision trees, each corresponding to one of the parameters in order to determine the resource configuration.

Figure 2:
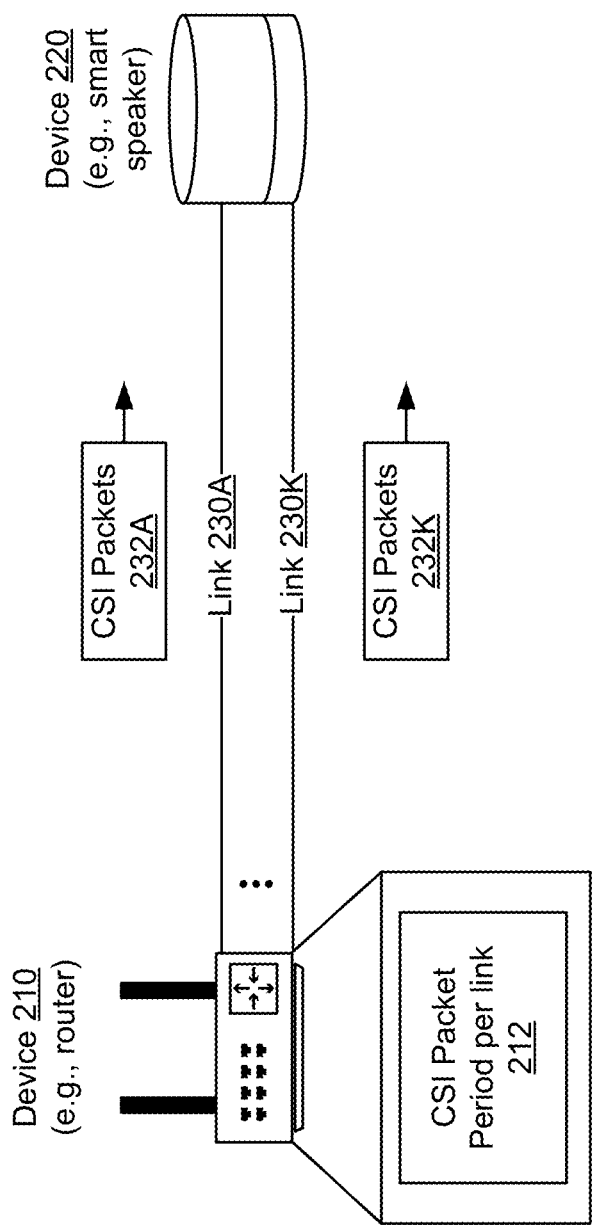
FIG. 2 illustrates an example of dynamic CSI packet transmissions over multiple links between devices, according to embodiments of the present disclosure.

FIG. 2 illustrates an example of dynamic CSI packet transmissions over multiple links between devices, according to embodiments of the present disclosure. A first device 210 and a second device 220 are illustrated. Nonetheless, the embodiments of the present disclosure similarly apply to a larger number of connected devices. Multiple links 230A through 230K (for a total of "K" links) exist between the first device 210 and the second device 220 and are used to transmit CSI packets, in addition to acknowledgements (ACKs) to the CSI packets and data packets. The first device 210 and the second device 220 are examples of the first device 110 and the second device 120, respectively, of FIG. 1. Likewise, each of the links 230A through 230K is an example of a link 130 of FIG. 1. In particular, each of the first device 210 and the second device 220 can include one more radios, and each radio has a MAC address and can support one or more frequency channels. A link is established between a first MAC address of a first radio of the first device 210 and a second MAC address of a second radio of the second device 220 and uses a particular frequency channel.

In an example, the first device 210 determines a CSI packet period per link 212 based on link parameters associated with the particular link and the first device 210. In other words, a CSI packet period can be specific to a link and can be different from a CSI packet period of another link. As illustrated in FIG. 2, the first device 210 determines a first CSI packet period for the link 230A and transits CSI packets 232A to the second device 220 over the link 230A according to the first CSI packet period. Likewise, the first device 210 determines a "K$^{th}$" CSI packet period for the link 230K and transmits CSI packets 232K to the second device 220 over the link 230K according to the "K$^{th}$" CSI packet period. The first packet period and the "K t" CSI packet period may, but need not, be the same.

To illustrate, the first device 210 is a router located in a room and the second device 220 is a smart speaker also located in the room. Two links are established between the two devices (i.e., K is equal to two in this illustration). Audio can be streamed from a remote audio source to the smart speaker via the router. An audio stream exists over the first link and uses a high audio resolution. No audio stream exists over the second link. Accordingly, the router maximizes the CSI packet transmission rate over the second link and minimizes (or sets it to zero) the CSI packet transmission rate over the first link. In this way, the audio stream may not be disrupted by the CSI packet transmissions, while maximizing the presence detection sensitivity at the same time.

Figure 3:
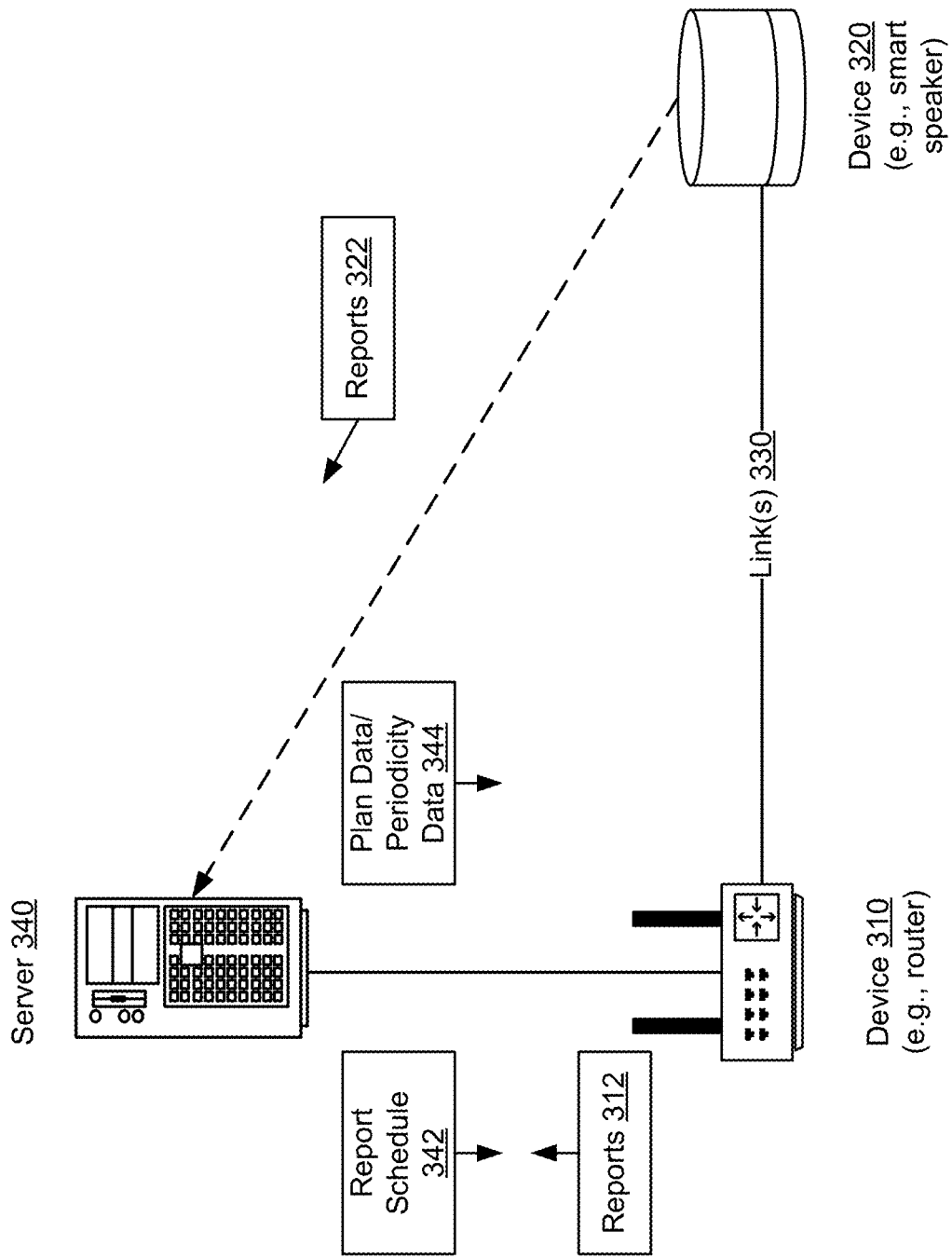
FIG. 3 illustrates an example of dynamic CSI packet transmissions between devices based on server data, according to embodiments of the present disclosure.

FIG. 3 illustrates an example of dynamic CSI packet transmissions between devices 310 and 320 based on server data provided by the server 340, according to embodiments of the present disclosure. Although two devices are illustrated, the embodiments of the present disclosure similarly apply to a larger number of connected devices. One or more links 330 exist between the first device 310 and the second device 320 and are used to transmit CSI packets, in addition to acknowledgements (ACKs) to the CSI packets and data packets. The first device 310 and the second device 320 are examples of the first device 110 and the second device 120, respectively, of FIG. 1. Likewise, each of the links 330 is an example of a link 130 of FIG. 1. Generally, the server 340 can control aspects of the CSI packet transmissions. In particular, the server 340 can send data to any or both devices 310 and 320 related to the CSI packet transmission periodicity.

In an example, the server 340 represents a remote computing resource that may be part of a standalone system or that may be implemented in a datacenter as a cloud computing service. The devices 310 and 320 can be registered under a user account maintained at the server 340. Computing services, such as audio streaming, can be facilitated by the server to the devices 310 and 320 based on the user account.

The first device 310 can be connected to the server 340 over one or more data networks including, for instance, the Internet. The second device 320 can also be connected to the server 340. This connection can be via the router 310 in the case of a mesh network, where the two devices 310 and 320 are nodes of the mesh network.

The server 340 sends first data, illustrated as a report schedule 342, to the first device 310 instructing the first device 310 about measurements requested to report to the server 340. For example, the report schedule 342 includes an identifier of the first device 310 (e.g., a device serial number (DSN) assigned to the first device 310 in the mesh network), a MAC address of a radio of the first device 310, an identifier of a frequency channel (e.g., a channel identifier), a start time of a time period, an end time of the time period, and the periodicity of the reporting during that time period. A similar report schedule can be sent to the second device 320. In the case of the mesh network, the report schedule 342 can include the reporting instructions for both devices 310 and 320 and the first device 310 can send, to the second device 320, the full report schedule 342 or only the portion thereof specific to the second device 320. An example of such a report schedule 342 is illustrated in Table 1 below, although a different data structure (e.g., a string, an array, or the like) can be similarly used.

TABLE 1

| DSN | MAC Address | Channel | Start Timestamp | End Timestamp | Periodicity |
|---|---|---|---|---|---|
| D0001 | 00:00:00:00:00:01 | 1 | 1589042251 | 1589042255 | 500 ms |
| D0001 | 00:00:00:00:00:01 | 6 | 1589042251 | 1589042255 | 500 ms |

The first device 310 sends second data to the server 340, where the second data reports the measurements based on the report schedule 342. This second data is illustrated in FIG. 3 as reports 312. For example, the reports can include a Metric Report and a Congestion Report. The Metric Report includes the identifier of the first device 310 (e.g., DSN), the MAC of the radio, a device type to identify the type of the first device 310 (e.g., router, phone, smart speaker, tablet, etc.), a start time of an activity (e.g., a start timestamp), an end time of the activity (e.g., an end timestamp), and a state of the activity (e.g., transmission activity to the second device 320, reception activity from the second device 320, association activity with the second device 320, disassociation activity from the second device 320, etc.). An example of such a Metric Report is illustrated in Table 2 below, although a different data structure (e.g., a string, an array, or the like) can be similarly used.

TABLE 2

| DSN | MAC Address | Device Type | Start Timestamp | End Timestamp | State |
|---|---|---|---|---|---|
| D0001 | 00:00:00:00:00:01 | 1 | 1589042431 | 1589042531 | Transmission activity |
| D0002 | 00:00:00:00:00:02 | 1 | 1589042251 | 1589042251 | Association activity |
| D0002 | 00:00:00:00:00:02 | 1 | 1589042441 | 1589042441 | Disassociation activity |
| D0003 | 00:00:00:00:00:03 | 2 | 1589042541 | 1589042561 | Reception activity |

The Congestion Report can include the identifier of the first device 310, the MAC address of the radio, channel, the start time and the end time of the measurements, an identifier of the frequency channel (e.g., a channel ID), and the channel airtime load. An example of such a Congestion Report is illustrated in Table 3 below, although a different data structure (e.g., a string, an array, or the like) can be similarly used.

TABLE 3

| DSN | MAC Address | Channel | Start Timestamp | End Timestamp | Load |
|---|---|---|---|---|---|
| D0001 | 00:00:00:00:00:01 | 1 | 1589042251 | 1589042255 | 23% |
| D0002 | 00:00:00:00:00:02 | 6 | 1589042261 | 1589042266 | 12% |
| D0002 | 00:00:00:00:00:02 | 11 | 1589042273 | 1589042277 | 5% |
| D0003 | 00:00:00:00:00:03 | 1 | 1589042286 | 1589042289 | 21% |

Similarly, the second device 320 can send reports 322 to the server 340, where the reports include a Metric Report and/or a Congestion Report. FIG. 3 uses a dashed arrow for the sending of the reports 322 to indicate that the reports 322 may, but need not, be sent, via the first device 310. Likewise, other devices may send corresponding reports.

In turn, the server 340 generates and sends third data to the first device 310 based on the reports 312, the reports 322, and/or the reports of the other devices. The third data can include, per link, one or more conditions associated with link parameters, CSI packet periods usable for the transmission of CSI packets, and one or more associations between the CSI packet periods and the conditions. A condition can indicate a range of values for a link parameter of a link or one or more sub-ranges of the range of values (e.g., a first range of values for a congestion of packet transmissions on the link, first and second sub-ranges of the first range, a second range of values for a packet error rate associated with the packet transmission, and the like). An association between a CSI packet period and the condition is in an indication in the third data that the CSI packet period is applicable to the link based on a value of the link parameter meeting the condition (e.g., a value of the congestion being within the first range or within one of the sub-ranges, a value of the packet error rate being within the second range, and the like). In this way, the third data can indicate, to the first device 310, that a particular CSI packet period is usable in association with CSI packet transmissions over the link when one or more conditions associated with one or more link parameters are met. The link parameter includes any of a congestion of packet transmissions on the link, a transmission time on the link, a reception time on the link, a packet error rate of the packet transmissions on the link, or a number of devices connected with the first device 310. FIG. 3 illustrates the third data as plan data and periodicity data 344. Similar data can be sent, via or independent of the first device 310, to the second device 320 to assist the second device with dynamically determining its CSI packet period. The plan data of the third data indicates to the first device 310 a schedule for CSI packet transmission per link. The periodicity data indicates to the first device 310 conditions that need to be met per link parameter to use a particular CSI packet period in support of the schedule. The plan data may include a reference to the periodicity data and/or vice versa.

In an example, the plan data associates a link (e.g., by identifying the MAC address of the radio of the first device 310, the MAC address of the radio of the second device 320, the device, a second MAC address of the other device, and a frequency channel) with a periodicity identifier. The periodicity data associates the periodicity identifier with one or more link parameters, conditions associated with the link parameters, and usable CSI packet periods depending on how conditions are met. The periodicity identifier can be a reference that is included in the plan data and in the periodicity data and that associates the schedule of a link with the condition(s) and link parameter(s) to apply to the link and the resulting CSI packet period. In particular, in the plan data, the reference is associated with the link, and in the periodicity data, the reference is associated with the condition(s), link parameter(s), and CSI packet period, In this way, the first device 310 can determine from the plan data a particular schedule for use on the link with the second device 320. Based on the periodicity identifier from this schedule (e.g., used as a reference to the periodicity data), the first device 310 looks up the applicable link parameter(s) from the periodicity data, determines how the condition(s) are met, and deduces the usable CSI packet period.

To illustrate, the plan data is implemented as a schedule plan. The schedule plan identifies source and destination MAC addresses to identify the link between two peers, the channel per link, the start time and the end time for the CSI transmissions (e.g., a start time stamp and an end timestamp), and an identifier of a periodicity matrix. Here, the identifier is an example of the periodicity identifier. An example of such a schedule plan is illustrated in Table 4 below, although a different data structure (e.g., a string, an array, or the like) can be similarly used.

TABLE 4

| Source MAC Address | Destination MAC Address | Chan. | Start Timestamp | End Timestamp | Periodicity Matrix |
|---|---|---|---|---|---|
| 00:00:00:00:00:01 | 00:00:00:00:11:01 | 36 | 1589042251 | 1589045255 | 1, 2 |
| 00:00:00:00:00:01 | 00:00:00:00:22:01 | 36 | 1589042251 | 1589045255 | 1 |
| 00:00:00:00:00:02 | 00:00:00:00:33:01 | 149 | 1589042251 | 1589046255 | 3 |

In this illustration, the periodicity data is implemented as a periodicity matrix. The periodicity matrix includes a set of conditions for triggering different CSI Packet Periods. One or more periodicity matrices can be associated with a schedule plan tuple. An example of such periodicity matrices is illustrated in Table 5 below, where each row corresponds to a periodicity matrix and has a corresponding periodicity identifier (shown as an "ID" in the first column). However, a different data structure (e.g., a string, an array, or the like) can be similarly used.

TABLE 5

| ID | Congestion | TX Time | RX Time | Packet Error Rate | Number of Clients | CSI Packet Period |
|---|---|---|---|---|---|---|
| 1 | <25% | <15% | <15% | <10% | <4 | 30 ms |
| 2 | >=25% | >=15% | >=15% | >=10% | >=4 | 100 ms |
| 3 | >=0% | >=0% | >=0% | >=0% | >=0% | 200 ms |

Referring back to the above illustration, the first device 310 receives the schedule plan shown in Table 4 and the periodicity matrices shown in Table 5. The first row of the schedule plan indicates that CSI packet transmissions on a link between the first device 310 and the second device 320 (e.g., associated with the source MAC address of 00:00:00:00:00:01 and the destination MAC address of 00:00:00:00:11:01 and using frequency channel 36) and during a time period (e.g., between times 1589042251 and 1589045255) is to follow periodicity matrix 1 and periodicity matrix 2. The first device 310 then looks up the periodicity matrices having identifiers 1 and 2 and determines the various conditions that need to be met for congestion, transmission time, reception time, and packet error rate on the link and the number of devices connected with the first device 310. Depending on how these conditions are met, the first device 310 can use a CSI packet period of thirty milliseconds or one hundred milliseconds to transmit CSI packets over the link. As further described in FIGS. 7 and 8, the first device 310 can generate decision trees, one per link parameter (e.g., per column of Table 5), where the number of branches and the branch nodes depend on the periodicity matrix identified (e.g., the rows of Table 5) and the decision nodes correspond to the CSI packet period column. The first device 310 can traverse the decision trees to determine a CSI packet period per decision tree and then select the largest CSI packet period for use.

Similarly, the second device 320 can receive plan data and periodicity data from the server 340. Based on such data, the second device 320 can determine and use a CSI packet period per link for CSI transmissions over the link.

Figure 4:
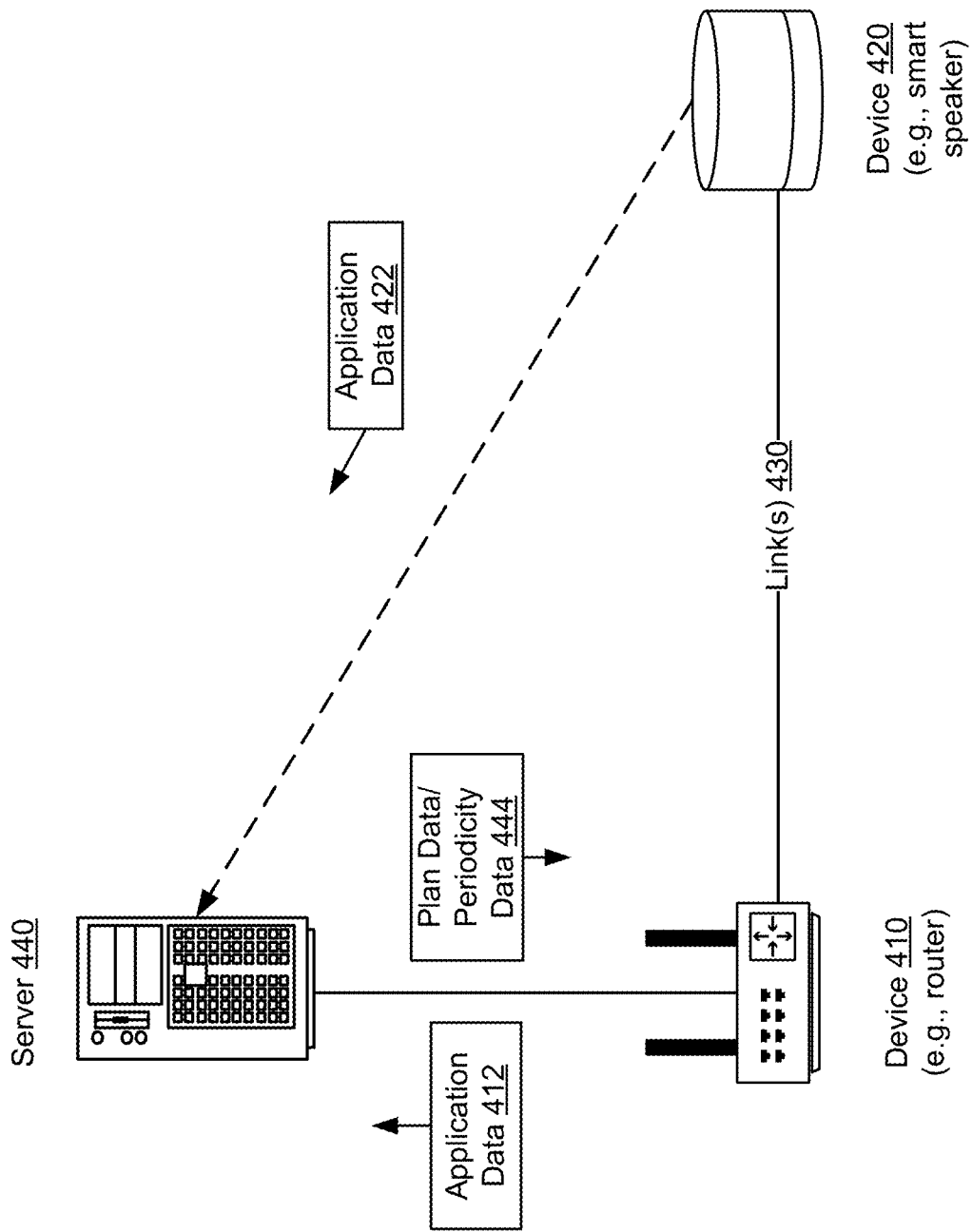
FIG. 4 illustrates an example of dynamic CSI packet transmissions between devices based on application data, according to embodiments of the present disclosure.

FIG. 4 illustrates an example of dynamic CSI packet transmissions between devices 410 and 420 based on application data, according to embodiments of the present disclosure. Although two devices are illustrated, the embodiments of the present disclosure similarly apply to a larger number of connected devices. One or more links 430 exist between the first device 410 and the second device 420 and are used to transmit CSI packets, in addition to acknowledgements (ACKs) to the CSI packets and data packets. At least the first device 410 is connected to a server 440 over one or more data networks including, for instance, the Internet. The first device 410, the second device 420 and the server 440 are examples of the first device 310, the second device 320, and the server 440, respectively, of FIG. 4. Each of the links 430 is an example of a link 130 of FIG. 1. In addition or alternative to relying on reports from devices, the server 430 relies on the application data to then send data to any or both devices 410 and 420, where the sent data relates to the CSI packet transmission periodicity.

In an example, the first device 410 sends application data 412 to the server 440. The application data 412 includes parameters and/or requirements related to one or more applications executing on the first device 410. The execution of an application can result in data transmission to the second device 420 over one or more of the links 430 and/or in to another device over one or more other links. Alternatively, the execution of the application may not result in data transmission, but nonetheless may add processing burden to the first device 410. The application data 412 can assist the server 440 with setting a schedule plan and/or a periodicity matrix for one or more of the links 430 depending on the parameters and/or requirements. For instance, when the application data 412 indicates the need for a data transmission rate within a particular range, the server 440 can instruct the first device 410 about adjusting the CSI packet transmission rate such that the data transmission rate can be met.

Similarly, the second device 420 can send application data 422 to the server 422. FIG. 4 uses a dashed arrow for the sending of the application data 422 to indicate that application data 422 may, but need not, be sent, via the first device 410. Likewise, other devices may send corresponding application data to the server 440. Based on the application data 412, the application data 422, and/or any of the other application data, the server 440 can instruct any of the first device 410 or the second device 420 about adjusting their CSI packet transmission rates.

In an example, the instructions are sent as plan data and/or periodicity data 444. The plan data and the periodicity data can be similar to the schedule plan and the periodicity matrices, respectively, described herein above in connection with FIG. 3. For instance, upon the application data 412 indicating a higher data transmission rate, the server 440 may send plan data indicating a shorter time period during which CSI transmissions are to occur. Additionally or alternatively, the server 440 may send data plan indicating a longer CSI packet period.

To illustrate, the application data 412 is sent as an application usage request. The application usage request includes an identifier of an application executing on the first device 410, an identifier of the application's or request's category (e.g., voice over internet protocol (VOIP)), video, etc.), a start time (e.g., a start timestamp) indicating the timing of when the requested usage starts, a duration of the request, a bandwidth needed by the application, and a latency requirement of the application. An example of such an application usage request is illustrated in Table 6 below, although a different data structure (e.g., a string, an array, or the like) can be similarly used.

TABLE 6

| AppID | Category | Start Timestamp | Duration | Bandwidth | Latency |
|---|---|---|---|---|---|
| X | Voice | 1589042431 | 300 s | 256 Kbps | 3 ms |
| Y | Video | 1589043212 | 3600 s | 5 Mbps | 500 ms |

Figure 5:
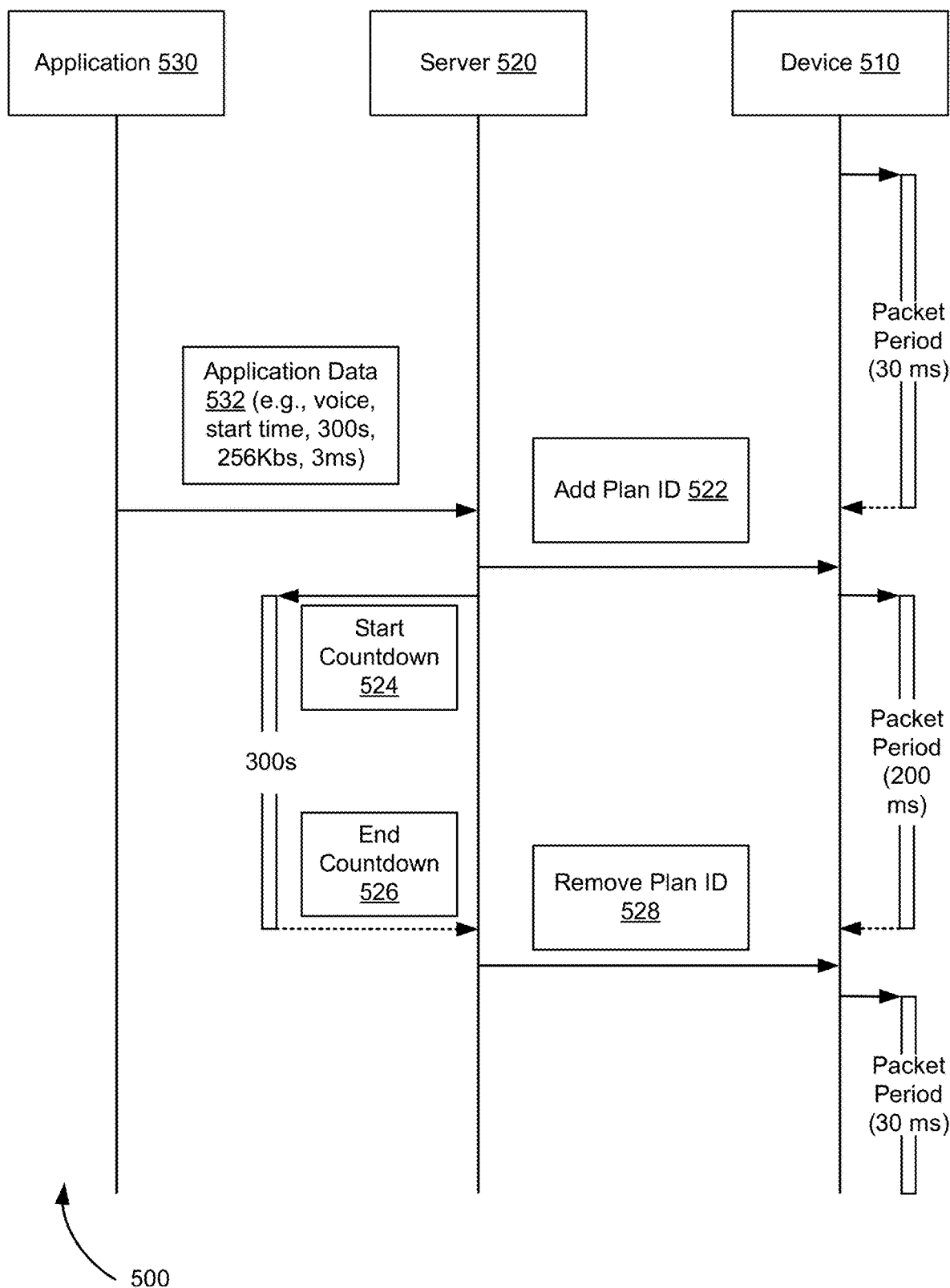
FIG. 5 illustrates an example of a sequence diagram for dynamic CSI packet transmissions between devices based on application data, according to embodiments of the present disclosure.

FIG. 5 illustrates an example of a sequence diagram 500 for dynamic CSI packet transmissions between devices based on application data, according to embodiments of the present disclosure. As illustrated in the sequence diagram 500, a device 510, similar to the device 410 of FIG. 4, may be performing CSI transmission to another device over a link at a CSI packet period (shown as thirty milliseconds). A server 520, similar to the server 440 of FIG. 4, may receive, from an application 530, application data 532 that includes parameters and/or requirements related to the execution of the application 530 (e.g., a request of voice, having a particular start time, lasting for three-hundreds seconds, at two-hundred fifty-six kilobits per second, and with a maximum of three milliseconds latency). The application 530 may be executing on the device 510, the other device, or yet another device that may not necessarily be connected to the device 510.

In turn, the server 520 sends first data to the device 510, where the first data instructs the device 510 in relation to changing the CSI packet period. The first data can include new or updated plan data (e.g., schedule plan). Additionally or alternatively, the first data can include new or updated periodicity data (e.g., periodicity matrices). In the illustration of FIG. 5, the first data instructs the device 510 to add a plan with a particular identifier (shown as add plan ID 522). For instance, and referring to Tables 4 and 5 above, prior to these instructions, the link corresponds to the first row in Table 4, where this first row identifies that periodicity matrices 1 and 2 from Table 5 are to be used and this use results in the thirty milliseconds CSI packet period. The instructions can request the device 510 to add the periodicity matrix 3 (e.g., in which case, the received data can include an updated first row of Table 4, where the "ID=3" is added to the last entry in that row). Accordingly, the device 510 determines that the CSI packet period should change to two-hundred milliseconds given how the conditions of the three periodicity matrices 1, 2, and 3 are met.

The server 520 starts a countdown (illustrated as start countdown 524) of the duration identified in the application data 532 (e.g., three-hundred seconds). During that duration, the device 510 transmits CSI packets over the link at the updated CSI packet period (e.g., every two-hundred milliseconds, a CSI packet is transmitted).

Upon an end of the countdown (illustrated as end countdown 526), the server 520 sends second data to the device 510, where the second data instructs the device 510 in order to change the CSI packet period back to its previous value. The second data can include new or updated plan data (e.g., schedule plan). Additionally or alternatively, the second data can include new or updated periodicity data (e.g., periodicity matrices). In the illustration of FIG. 5, the second data instructs the device 510 to remove the plan with the particular identifier (shown as remove plan ID 528). For instance, and referring again to Tables 4 and 5 above, the instructions can request the device 510 to remove the periodicity matrix 3 (e.g., in which case, the received data can include an updated first row of Table 4, where the "ID=3" is removed from the last entry in that row). Accordingly, the device 510 determines that the CSI packet period should change back to thirty milliseconds given how the conditions of the two periodicity matrices 1 and 2 are met. From that point on, the device 510 transmits CSI packets over the link at the thirty milliseconds CSI packet period, until further instructions from the server 520.

Figure 6:
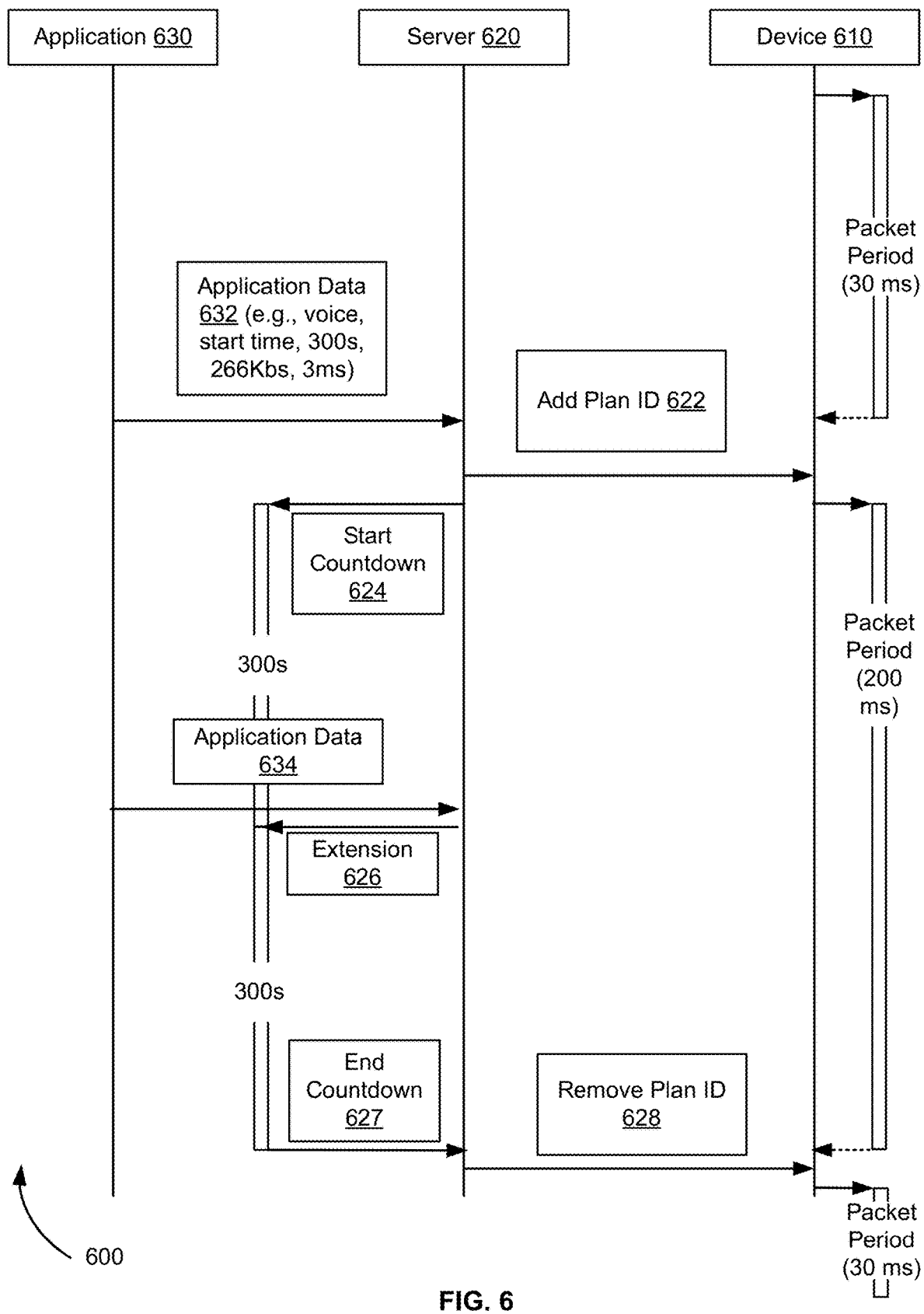
FIG. 6 illustrates another example of a sequence diagram for dynamic CSI packet transmissions between devices based on application data, according to embodiments of the present disclosure.

FIG. 6 illustrates another example of a sequence diagram 600 for dynamic CSI packet transmissions between devices based on application data, according to embodiments of the present disclosure. Here, the application data may be renewed such that any change to an updated CSI packet period can be extended. As illustrated in the sequence diagram 600, a device 610, similar to the device 510 of FIG. 5, may be performing CSI transmission to another device over a link at a CSI packet period (shown as thirty milliseconds). A server 620, similar to the server 520 of FIG. 5, may receive, from an application 630, application data 632 that includes parameters and/or requirements related to the execution of the application 630 (e.g., a request of voice communication session having a particular start time, lasting for three-hundreds seconds, at two-hundred fifty-six kilobits per second, and with a maximum of three milliseconds latency). The application 630 may be similar to the application 530 of FIG. 5.

In turn, the server 620 sends first data to the device 610, where the first data instructs the device 610 in relation to changing the CSI packet period. The first data can include new or updated plan data (e.g., schedule plan). Additionally or alternatively, the first data can include new or updated periodicity data (e.g., periodicity matrices). In the illustration of FIG. 6, the first data instructs the device 610 to add a plan with a particular identifier (shown as add plan ID 622). For instance, and referring to Tables 4 and 5 above, prior to these instructions, the link corresponds to the first row in Table 4 identifying that periodicity matrices 1 and 2 from Table 5 are to be used and this use results in the thirty milliseconds CSI packet period. The instructions can request the device 610 to add the periodicity matrix 3 (e.g., in which case, the received data can include an updated first row of Table 4, where the "ID=3" is added to the last entry in that row). Accordingly, the device 610 determines that the CSI packet period should change to two-hundred milliseconds given how the conditions of the three periodicity matrices 1, 2, and 3 are met.

The server 620 starts a countdown (illustrated as start countdown 624) of the duration identified in the application data 632 (e.g., three-hundred seconds). From that point on, the device 610 transmits CSI packets over the link at the updated CSI packet period (e.g., every two-hundred milliseconds, a CSI packet is transmitted). And the device 610 continues transmitting CSI packets over the link at the updated CSI packet period until further instructions from the server 620.

Prior to an end of the countdown, the server 620 receives additional application data 634 from the application 630. This application data 634 can be the same as the application data 632, or one or more of the indicated parameters and/or requirements can differ between the application data 632 and the application data 634. In the illustration of FIG. 6, the application data 634 represents a request to renew the application usage by another three-hundred milliseconds. Accordingly, the server 620 restarts the countdown (shown as extension 626).

Upon an end of the countdown (illustrated as end countdown 627), the server 620 sends second data to the device 610, where the second data instructs the device 610 about changing the CSI packet period back to its previous value. The second data can include new or updated plan data (e.g., schedule plan). Additionally or alternatively, the second data can include new or updated periodicity data (e.g., periodicity matrices). In the illustration of FIG. 6, the second data instructs the device 610 to remove the plan with the particular identifier (shown as remove plan ID 628). For instance, and referring again to Tables 4 and 5 above, the instructions can request the device 610 to remove the periodicity matrix 3 (e.g., in which case, the received data can include an updated first row of Table 4, where the "ID=3" is removed from the last entry in that row). Accordingly, the device 610 determines that the CSI packet period should change back to thirty milliseconds given how the conditions of the two periodicity matrices 1 and 2 are met. From that point on, the device 610 transmits CSI packets over the link at the thirty milliseconds CSI packet period, until further instructions from the server 620.

Figure 7:
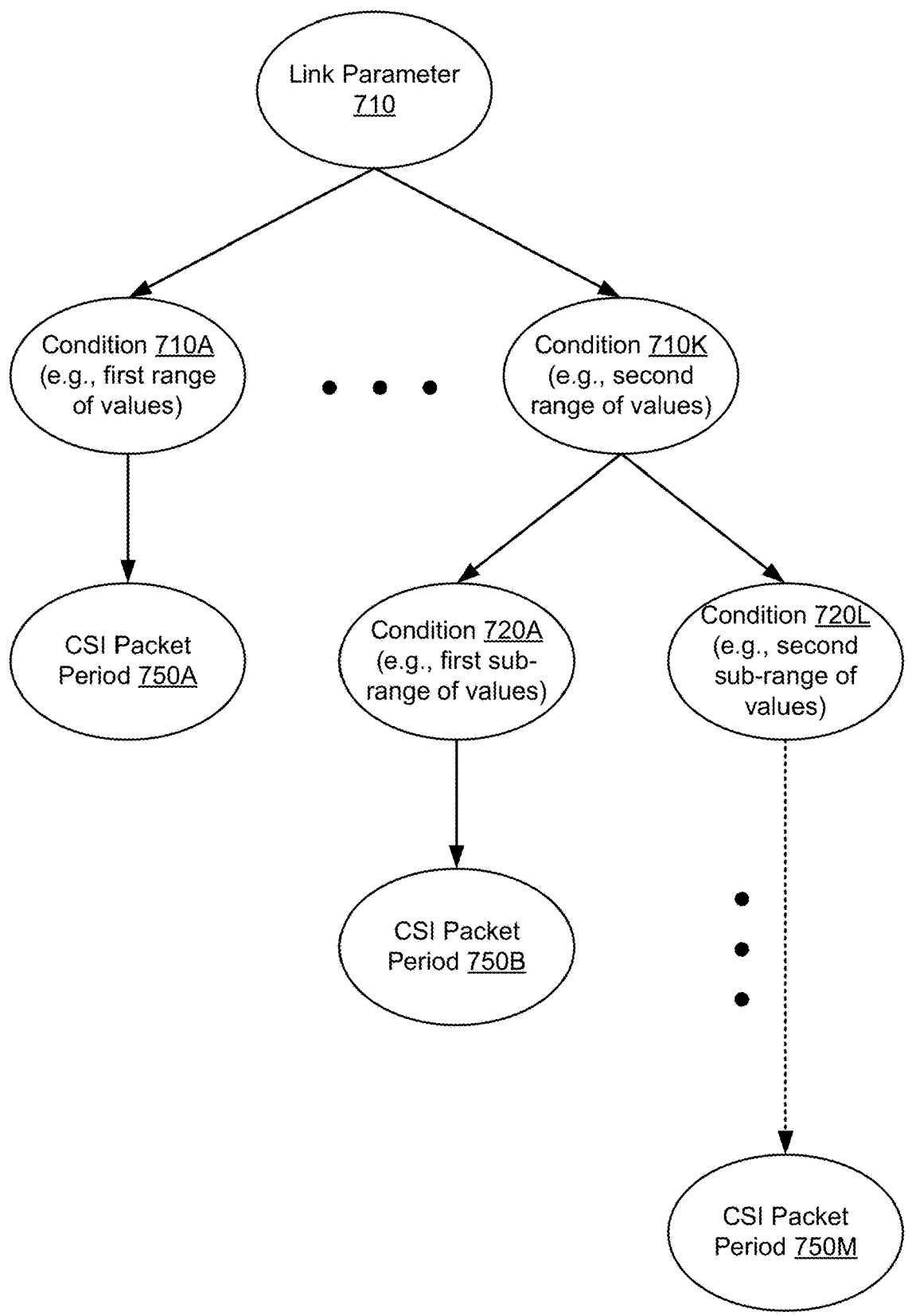
FIG. 7 illustrates an example of a decision tree usable to determine a CSI packet period, according to embodiments of the present disclosure.

FIG. 7 illustrates an example of a decision tree usable to determine a CSI packet period, according to embodiments of the present disclosure. Generally, the decision tree represents a model usable to decide on a CSI packet period given how conditions associated with a link parameter are met. In an example, the structure of the decision tree includes a root node at a top level of a hierarchy. At the next level of the hierarchy, one or more branch nodes can be connected to the root node. At other lower levels of the hierarchies, one or more branch nodes may similarly exist all the way to the lowest level of the hierarchy. The lowest level includes decision nodes, each of which can be connected to one or more branch nodes. The decision can be generated based on the plan data and the schedule data. In particular, the decision tree can correspond to one of the columns of Table 5, where the root node corresponds to the link parameter identified in the column, where the branch nodes correspond to the conditions (e.g., ranges and sub-ranges of values) identified as being applicable given the periodicity matrix identifiers, and where the decision nodes correspond to the CSI packet periods associated with the conditions.

In the illustration of FIG. 7, the root node represents the link parameter 710. Next, K branch nodes are connected to the root node, each representing a condition (illustrated as condition 710 through condition 710K, and each of which corresponds to a range of values. For instance, the condition 710 indicates a first range of values, and the condition 710K indicates a second range of values). If condition 710A is met, the decision moves to a decision node that corresponds to a CSI packet period 750A associated with the condition 710A (e.g., with the first range of values indicated by the condition 710A). Otherwise, one of the remaining conditions are met and the decision moves down the branch corresponding to the condition that is met. For instance, if the condition 710K is met, the decision moves down to the next hierarchy level that includes L branch nodes corresponding to condition 720A through condition 720L. Each of the condition 720A through the condition 720L corresponds to a sub-range of values within the range of values indicated by the condition 710K (e.g., the condition 720A indicates a first sub-range of the second range, and the condition 720L indicates a second sub-range of the second range). Depending on which of these conditions is met, the decision moves and so on and so forth to traverse the decision tree through various conditions and until reaching a decision node from M possible decision nodes. For instance, if condition 720A is met, a CSI packet period 750B is determined based on this CSI packet period 750B being associated with the first sub-range of values. Otherwise, the traversal of the decision continues which can result in determining a CSI packet period 750M.

Generally, the M number of decision nodes correspond to M possible CSI packet periods. The M possible CSI packet periods can include various values or an infinite periodicity (e.g., no CSI transmission) as defined by, for instance, a server. The number of branch nodes and branches of the decision tree can depend on the number of applicable conditions (and, more specifically, the different ranges and sub-ranges of values).

Figure 8:
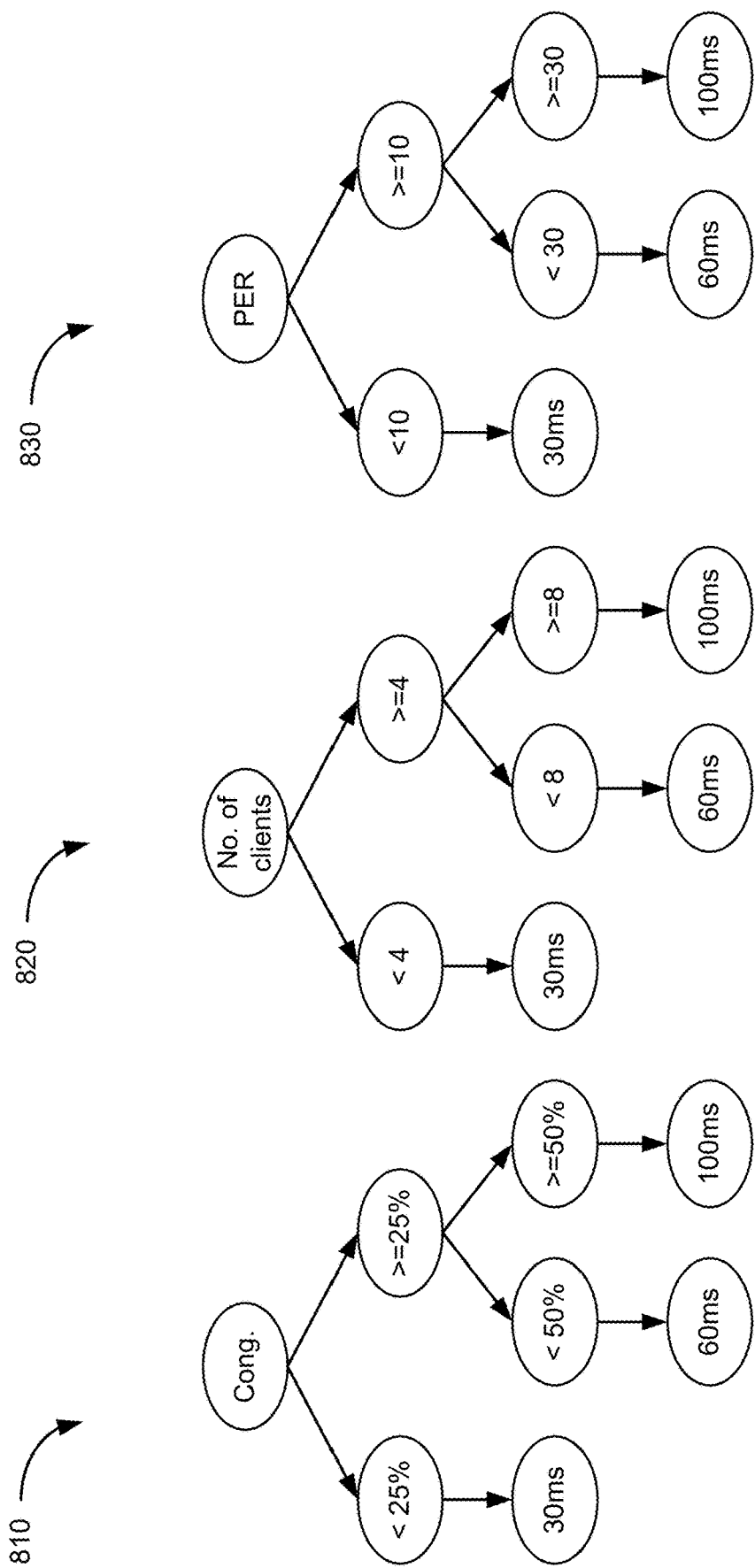
FIG. 8 illustrates an example of decision trees specific to three link parameters, according to embodiments of the present disclosure.

FIG. 8 illustrates an example of decision trees specific to three link parameters, according to embodiments of the present disclosure. Here, three link parameters are illustrated: congestion, number of clients, and packet error rate. Nonetheless, the embodiments of the present disclosure similarly apply to other link parameters.

As illustrated, a first decision tree 810 is associated with the congestion, where this link parameter corresponds to the root node of the first decision tree 810. The first decision tree 810 also includes three branches (less than twenty-five percent, between twenty-five percent and fifty percent, and more than fifty percent) and three decision nodes (thirty milliseconds, sixty milliseconds, and one hundred milliseconds), each corresponding to a branch.

According to the first decision tree 810, a device measures a congestion on a link. If the congestion is less than twenty-five percent, the device determines a candidate CSI packet period of thirty milliseconds. If the congestion is between twenty-five percent and fifty percent, the device determines a candidate CSI packet period of sixty milliseconds. Otherwise, the device determines a candidate CSI packet period of one hundred milliseconds.

A second decision tree 820 is associated with the number of clients (e.g., the number of devices connected to the device). Here also, the number of clients corresponds to the root node of the second decision tree 820. The second decision tree 820 includes three branches (less than four, between four and eight, and more than eight) and three decision nodes (thirty milliseconds, sixty milliseconds, and one hundred milliseconds), each corresponding to a branch.

According to the second decision tree 820, the device determines the number of its connected device. If the number is less than four, the device determines a candidate CSI packet period of thirty milliseconds. If the number is between four and eight, the device determines a candidate CSI packet period of sixty milliseconds. Otherwise, the device determines a candidate CSI packet period of one hundred milliseconds.

A third decision tree 830 is associated with the packet error rate over the link. Here also, the packet error rate corresponds to the root node of the third decision tree 830. The third decision tree 830 includes three branches (less than ten, between ten and thirty, and more than thirty) and three decision nodes (thirty milliseconds, sixty milliseconds, and one hundred milliseconds), each corresponding to a branch.

According to the third decision tree 830, the device measures the packet error rate. If the number is less than ten per a hundred packets, the device determines a candidate CSI packet period of thirty milliseconds. If the number is between ten and thirty per a hundred packets, the device determines a candidate CSI packet period of sixty milliseconds. Otherwise, the device determines a candidate CSI packet period of one hundred milliseconds.

In the illustration of FIG. 8, three candidate CSI packet periods are determined, one per decision tree. If they are not the same, the device selects one of the three candidate CSI packet periods as the CSI packet period to use for the CSI transmissions over the link. In an example, the device selects the largest candidate CSI packet period (e.g., the maximum of the three).

Figure 9:
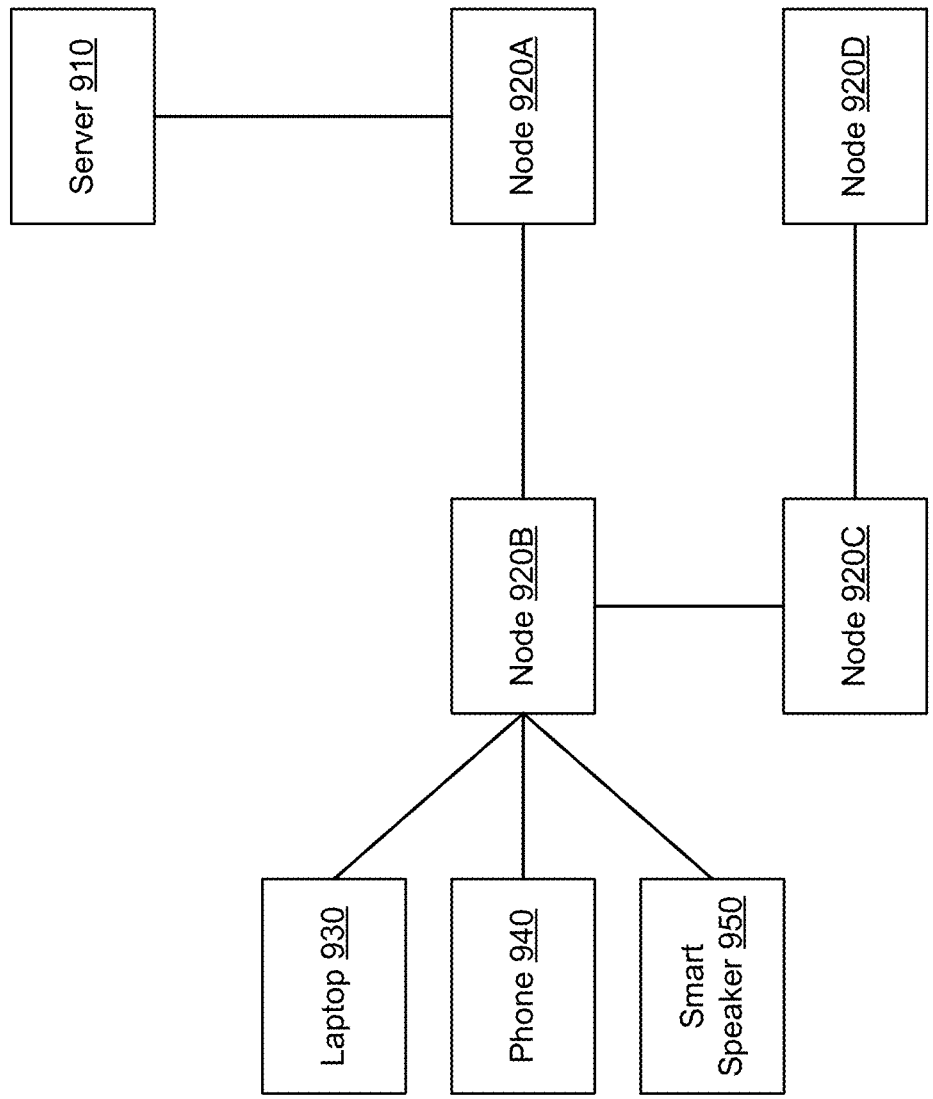
FIG. 9 illustrates an example of a mesh network that includes a number of devices implementing dynamic CSI packet transmissions, according to embodiments of the present disclosure.

FIG. 9 illustrates an example of a mesh network that includes a number of devices implementing dynamic CSI packet transmissions, according to embodiments of the present disclosure. In an example, a server 910 is connected with the mesh network, such as with a node 920A. In turn, the node 920A is connected with a node 920B. In turn, the node 920B is connected with a node 920C, and the node 920C is connected with a node 920D. The nodes 920A, 920B, 920C, and 920D form the mesh network and each can be a wireless router. Of course, other network topologies of the mesh network are possible.

Transiently, a number of mobile devices can join the mesh network by connecting with one or more of the nodes 920A, 920B, 920C, and 920D. For example, at various times, a laptop 930, a phone 940, and a smart speaker 950 connect with the node 920B. Similarly, at other times, any or all of the laptop 930, the phone 940, and the smart speaker 950 can disconnect from the node 920B and connect with any of the remaining nodes 920A, 920C, or 920D. Each connection between two nodes and between a node and the laptop 930, the phone 940, or the smart speaker 950 can include one or more links. For each link, a CSI packet period may be dynamically determined and used for CSI transmissions over the link.

The server 910 can request and receive reports from any or all of the nodes 920A, 920B, 920C, and 920D, the laptop 930, the phone 940, and the smart speaker 950. Further, the server can receive application data from any or all of the nodes 920A, 920B, 920C, and 920D, the laptop 930, the phone 940, and the smart speaker 950. Based on the reports and/or the application data, the server 910 can send to the nodes 920A, 920B, 920C, and 920D, the laptop 930, the phone 940, and the smart speaker 950 schedule plans and/or periodicity matrices to assist with the determination of CSI packet periods. The determination of a CSI packet period can rely on a traversal of one or more decision trees generated according to schedule plans and/or periodicity matrices.

Figure 10:
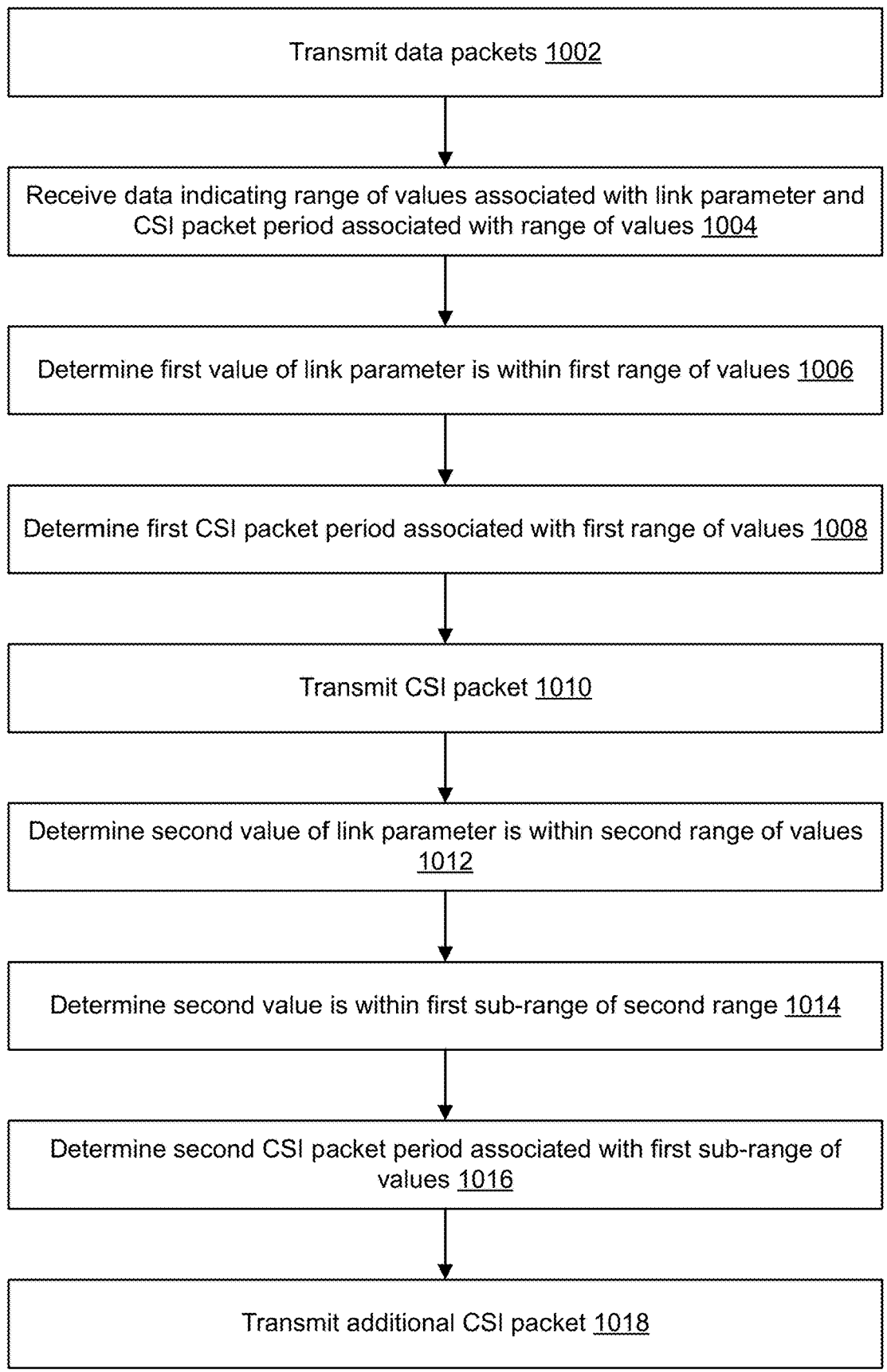
FIG. 10 illustrates an example of a flow of dynamic CSI packet transmissions, according to embodiments of the present disclosure.
Figure 11:
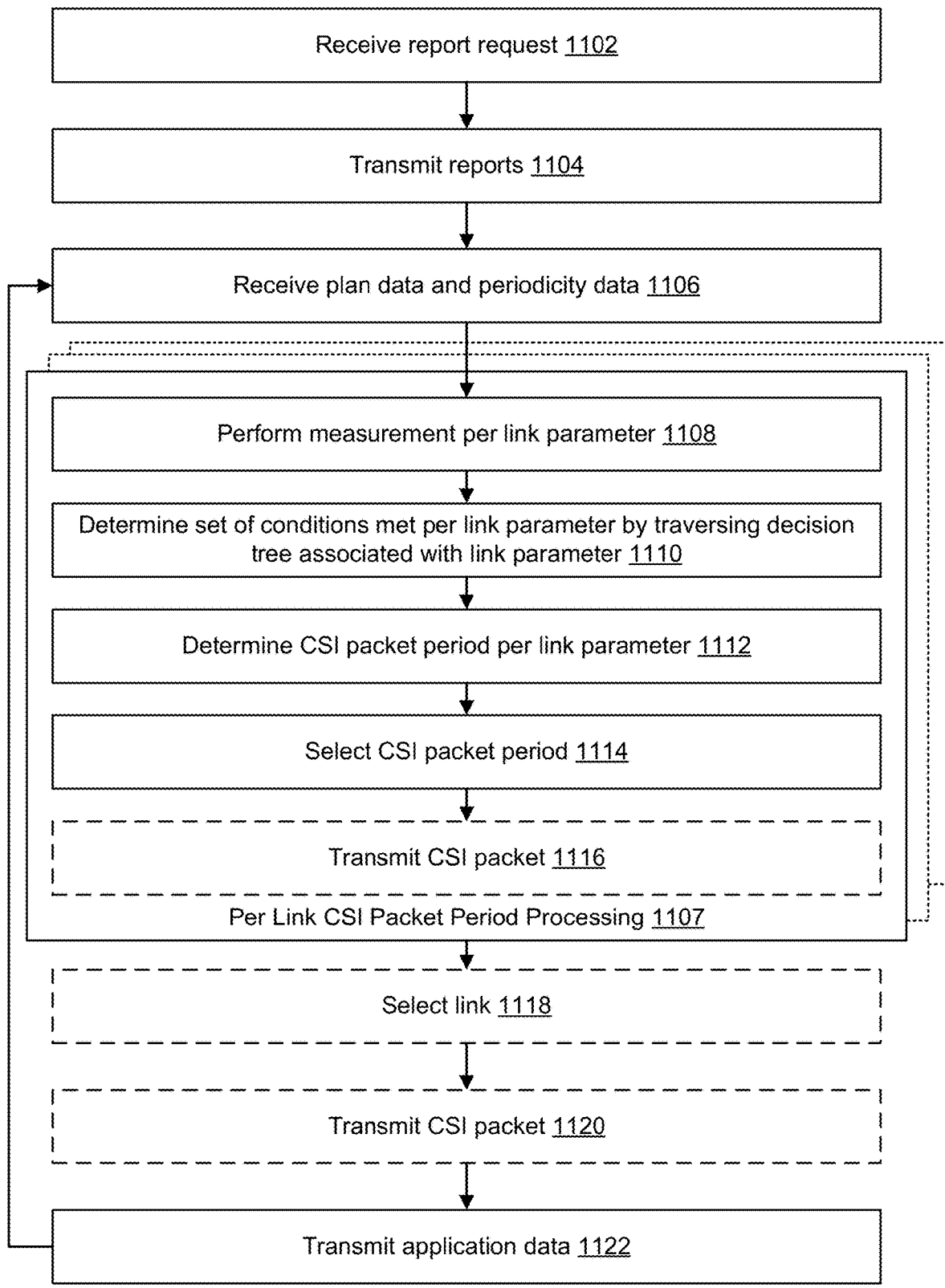
FIG. 11 illustrates another example of a flow of dynamic CSI packet transmissions, according to embodiments of the present disclosure.

FIGS. 10 and 11 illustrate examples of flows for determining a dynamic CSI packet period. Operations of the flows can be performed by a device, such as any of the devices described herein above. Some or all of the instructions for performing the operations of flows can be implemented as hardware circuitry and/or stored as computer-readable instructions on a non-transitory computer-readable medium of the device. As implemented, the instructions represent modules that include circuitry or code executable by processors of the device. The use of such instructions configures the device to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

In the interest of clarity of explanation, the flows are described in connection with adjusting the CSI packet period. However, the flows similarly apply to adjusting other resources for the transmission of CSI packets including, for instance, bandwidth and number of antennas.

FIG. 10 illustrates an example of a flow of dynamic CSI packet transmissions, according to embodiments of the present disclosure. In the interest of clarity of explanation, each operation of FIG. 10 is illustrated in connection with a link. Nonetheless, the operations can be repeated for each link of the device.

In an example, the flow includes operation 1002, where the device sends data packets to a second device over a link. For instance, the data packets, such as audio packets, are sent based on an execution of an application on the device.

In an example, the flow also includes operation 1004, where the device receives data indicating a range of values associated with a link parameter of the link and indicating a CSI packet period associated with the range of values. For instance, the data can be received from a server. Alternatively, the data can be pre-stored in local memory of the device and retrieved from the memory. In both examples, the data can indicate range of values per link parameter of the link and sub-ranges of values, as applicable, per range. The data can also indicate per range or sub-range, as applicable, a candidate CSI packet period. As such, depending on measurements on the link parameters, these measurements can be compared to the ranges and sub-ranges of values to determine, from candidate CSI packet periods, a CSI packet period to use in the transmission of CSI packets over the link. In an illustration, the data includes server plan data (e.g., a schedule plan) and periodicity data (e.g., periodicity matrices). Such data can identify each link parameter, applicable conditions thereto (e.g., ranges and sub-ranges), and candidate CSI packet periods.

In an example, the flow also includes operation 1006, where the device determines that a first value of the link parameter is within a first range of values. For instance, the first value corresponds to a measurement of the link parameter on the first link (e.g., the current congestion value of the congestion). The device compares the first value to the ranges of values indicated by the data for the link parameter and determines that the first value falls within the first range. If the first range includes sub-ranges, the device further compares the first value to the sub-ranges to determine the particular sub-range that includes the first value.

In an example, the flow includes operation 1008, where the device determines a first CSI packet period that is associated with the first range of values. For instance, the association between the first CSI packet period and the first range is indicated by the data and can be determined from a decision tree generated based on the data. If the first range includes sub-ranges, the first CSI packet period is determined based on an association with the particular sub-range that includes the first value.

To illustrate, the first range of values corresponds to a condition defined for congestion of packet transmission on the link. A first measurement of the congestion is determined. The value of this first measurement can be due to ongoing packet transmissions on the link and can be compared to the first range of values. If the first measurement is within the first range of values, the condition is met. Similarly, the condition can indicate a range of value per link parameter (e.g., a range for each of the packet error rate, a transmission time, a reception time, and a number of connected devices). Measurements are performed to determine the current value of each of these links and the current values are compared to the applicable ranges in order to derive the CSI packet period. In an illustrative example, the device generates a decision trees, where each tree corresponds to a link parameter and includes branches and branch nodes depending on the conditions. A branch node corresponds to a condition and a decision node corresponds to a candidate CSI packet period. The device performs measurements of the link parameters on the link and determines how the measurements meet the conditions. In particular, the device uses the measurements of a link parameter in a traversal of the decision tree that corresponds to the link parameter to identify one of the candidate CSI packet periods. Operation 1008 can be repeated for the different link parameters. If the determined candidate CSI packet periods do not match, the device selects the largest one of them as the CSI packet period to use for the link.

In an example, the flow also includes operation 1010, where the device transmits a CSI packet over the link based on the first CSI packet period determined for the link (and/or a new resource configuration for CSI packet transmission). For instance, the CSI packet transmission rate over the link is set according to the first CSI packet period. In particular, the device transmits over the link, a first CSI packet at a first time and a second CSI packet at a second time. The difference between the second time and the first time is equal to the first CSI packet period.

In an example, the flow also includes operation 1012, where the device determines that a second value of the link parameter is within a second range of values that is associated with a second CSI packet period. For instance, the second value is determined at a different time than the first value and is an updated link parameter value (e.g., an updated congestion value of the congestion). The second value can be different than the first value, in which case the second value corresponds to a change of the link parameter.

In an example, the flow also includes operation 1014, where the device determines that the second value is within a first sub-range of the second range of values. For instance, the second sub-range includes the first sub-range and a second sub-range of values. The device compares the second value to each of these sub-ranges and determines that the first sub-range includes the second value.

In an example, the flow also includes operation 1016, where the device determines a second CSI packet period (and/or a new resource configuration for CSI packet transmission). If the current value of the link parameter changed, the first CSI packet period may no longer be applicable. Instead, the second CSI packet is applicable based on the association with the first sub-range of values and on the second value falling within the first sub-range.

In an example, the flow also includes operation 1018, where the device transmits an additional CSI packet over the link based on the second CSI packet period (and/or a new resource configuration for CSI packet transmission). For instance, the CSI packet transmission rate over the link is set again according to the second CSI packet period.

FIG. 11 illustrates another example of a flow of dynamic CSI packet transmissions, according to embodiments of the present disclosure. Operations of the flow of FIG. 11 can be implemented as sub-operations of the flow of FIG. 10.

In an example, the flow of FIG. 11 includes operation 1102, where the device receives a report request. For instance, the report request is received from the server and corresponds to a report schedule having a data structure similar to the one shown in Table 1.

In an example, the flow also includes operation 1104, where the device transmits reports to the server. For instance, the reports include a metric report and a congestion report having data structures similar to the ones shown in Table 2 and 3, respectively. In particular, the device collects metrics and performs congestion measurements per link and sends the resulting reports to the server.

In an example, the flow also includes operation 1106, where the device receives plan data and periodicity data from the server. For instance, the plan data and the periodicity data are generated by the server based on the reports of the device, reports of other devices, and/or application data. The plan data can be a schedule plan having a data structure similar to the one shown in Table 4. The periodicity data can be periodicity matrices, having a data structure similar to the one shown in Table 5.

In an example, the flow also includes operation 1107, where the device processes the plan data and the periodicity data for a link. Operation 1107 can be repeated for the various links of the device, as illustrated with the dotted rectangles.

In an example, the flow also includes operation 1108 as a sub-operation of operation 1107, where the device performs measurements per link parameter. For instance, the periodicity data identifies different link parameters that need to be measured. The measurements can be performed at the physical layer, the MAC layer, and/or the application layer.

In an example, the flow also includes operation 1110 as a sub-operation of operation 1107, where the device determines a set of conditions that are met per link parameter by traversing a decision tree associated with the link parameter. For instance, for each of the link parameters, a decision tree is generated (e.g., as illustrated in FIG. 8) and is traversed by using the measurements for the link parameter.

In an example, the flow also includes operation 1112 as a sub-operation of operation 1107, where the device determines a CSI packet period per link parameter. For instance, upon a traversal of a tree associated with a link parameter, the device determines a candidate CSI packet period. This candidate CSI packet corresponds to the decision node identified based on the traversal.

In an example, the flow also includes operation 1114 as a sub-operation of operation 1107, where the device selects a CSI packet period from the candidate CSI packet periods determined for the different link parameters. For instance, the device selects the largest candidate CSI packet period as the CSI packet period to use for the link.

In an example, the flow also includes operation 1116 as a sub-operation of operation 1107, where the device transmits a CSI packet over the link based on the selected CSI packet period. This operation 1116 is illustrated with a dashed box to indicate that it can be performed instead of, or in addition to, operations 1118 and 1120.

In an example, the flow also includes operation 1118, where the device selects a link from the different links of the device for the CSI transmission. Here, a CSI packet period has been determined per link, based on repeating operation 1107. However, rather than performing CSI transmissions on these multiple links, one of them is selected and used for CSI transmissions. The link selection can follow techniques further described in the next figures.

In an example, the flow also includes operation 1120, where the device transmits a CSI packet over the selected link. This CSI transmission can be based on the CSI packet period determined for the selected link.

In an example, the flow also includes operation 1122, where the device transmits application data to the server 1122. The application data may cause the server to send updated plan data and/or periodicity data. If so, such updates can be received at operation 1106, where this operation can be repeated as indicated with the loop back from operation 1122 to operation 1106.

Figure 12:
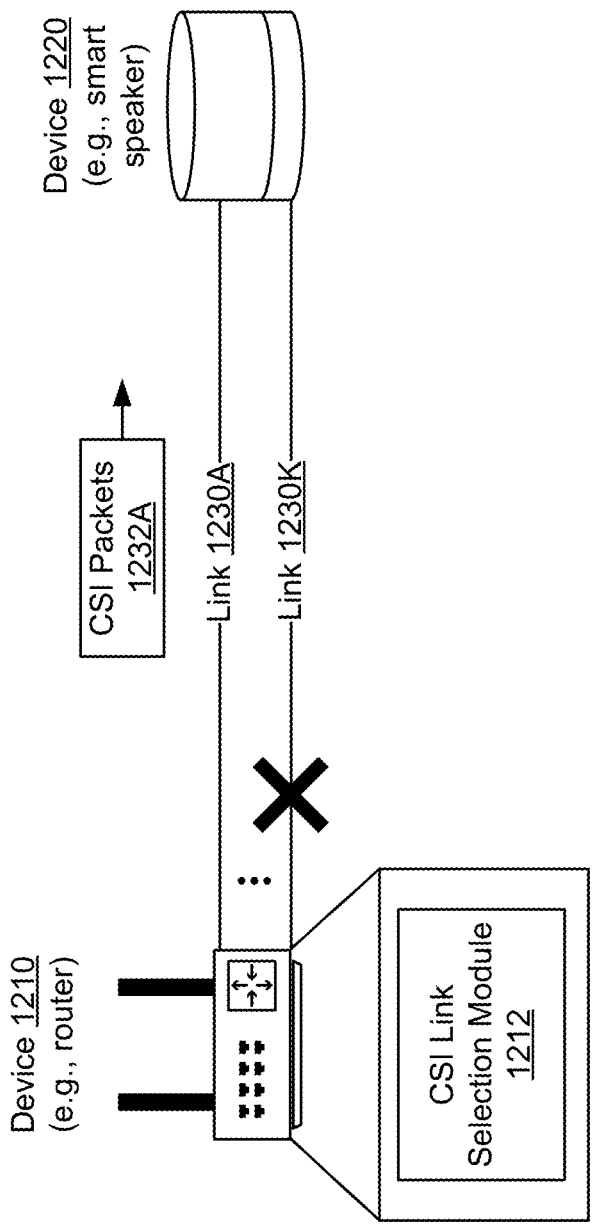
FIG. 12 illustrates an example of a selection of a link for CSI packet transmissions, according to embodiments of the present disclosure.

FIG. 12 illustrates an example of a selection of a link for CSI packet transmissions, according to embodiments of the present disclosure. A first device 1210 and a second device 1220 are illustrated. Nonetheless, the embodiments of the present disclosure similarly apply to a larger number of connected devices. Multiple links 1230A through 1230K (for a total of "K" links) exist between the first device 1210 and the second device 1220 and can be used to transmit CSI packets, in addition to acknowledgements (ACKs) to the CSI packets and data packets. The first device 1210 and the second device 1220 are examples of the first device 110 and the second device 120, respectively, of FIG. 1. Likewise, each of the links 1230A through 1230K is an example of a link 130 of FIG. 1. In particular, each of the first device 1210 and the second device 1220 can include one more radios, and each radio has a MAC address and can support one or more frequency channels. A link is established between a first MAC address of a first radio of the first device 1210 and a second MAC address of a second radio of the second device 1220 and uses a particular frequency channel. Here, rather than performing CSI transmissions on all the links 1230A through 1230K, the first device 1210 selects a subset of the links 1230A through 1230K and performs the CSI transmissions on the subset.

In an example, the first device 1210 includes a CSI link selection module 1212 that selects the link(s). The selection includes determining the link(s) to use and the number of such links. In addition, the first device 1210 can determine a CSI packet period per selected link. The determination of a link includes a comparison of parameters associated with the different links. The parameters can include physical layer parameters, such as the packet error rate (PER), the physical layer (PHY) rate, and the RSSI. Further, the parameters can be associated with priorities and ranges. In this case, the comparison starts with the parameter having the highest priority. If this parameter is similar between the links, the comparison proceeds to the parameter having the next priority, and so on and so forth. The measurements of a parameter on two links are similar if the difference between the measurements (e.g., parameter) is within the range associated with the parameter. Otherwise, the measurements are not dissimilar.

To illustrate, consider an example of a comparison between link 1230A and 1230K for the PER, PHY rate, and RSSI. The PER has a higher priority than the PHY rate and, in turn, the PHY rate has a higher priority than RSSI. In addition, the PER is associated with a PER range of ten percent, the PHY rate is associated with a PHY rate range of three-hundred percent, and the RSSI is associated with a ten decibel (10 db) range. In this illustration, the CSI link selection module 1212 starts with the comparison of PERs of the links 1230A and 1230K given that the PER parameter has the highest priority. If the PER difference (or ratio) indicates that the PER of the link 1230A is lower than that of the link 1230K and is outside the PER range (e.g., more than ten percent), the CSI link selection module 1212 selects the link 1230A. If the PER difference (or ratio) indicates that the PER of the link 1230K is lower than that of the link 1230A and is outside the PER range (e.g., more than ten percent), the CSI link selection module 1212 selects the link 1230K. Otherwise, the PER is similar between the two links 1230A and 1230K, and the CSI link selection module 1212 proceeds to compare the PHY rates of the of links 1230A and 1230K given that the PHY rate parameter has the next priority. Similarly here, if the PHY rate difference (or ratio) indicates that the PHY rate of the link 1230A is lower than that of the link 1230K and is outside the PHY rate range (e.g., more than three-hundred percent), the CSI link selection module 1212 selects the link 1230A. If the PHY rate difference (or ratio) indicates that the PHY rate of the link 1230K is lower than that of the link 1230A and is outside the PHY rate range (e.g., more than three-hundred percent), the CSI link selection module 1212 selects the link 1230K. Otherwise, the PHY rate is similar between the two links 1230A and 1230K, and the CSI link selection module 1212 proceeds to compare the RSSIs of the of links 1230A and 1230K. Here, given that the RSSI parameter has the lowest priority and no other parameters are to be further compared, the CSI link selection module 1212 selects the link that has the largest RSSI.

The number of links to select can be one (e.g., select one and only one of the links 1230A through 1230K). Otherwise, this number can correspond to a subset L of the links 1230A through 1230K (where L is smaller than K and is more than one). If more than two links are to be selected, the CSI link selection module 1212 still uses the priorities and ranges as described above to select. For instance, the CSI link selection module 1212 selects the two or more links that have the best PERs. If the PERs are similar, the CSI link selection module 1212 selects the two or more links that have the best PHY rates. And if the PHY rates are similar, the CSI link selection module 1212 selects the two or more links that have the best RSSIs.

For a selected link, the first device 1210 can determine a CSI packet period to use. In one example, the CSI packet period is dynamic and can be determined using the techniques described herein above. In another example, the CSI packet period can preconfigured to be a fixed time interval.

Data about the various parameters to use and their priorities and ranges, the number of links to select, and/or whether dynamic CSI packet periods are to be used can pre-stored at the first device 1210 in one or more data structures. Alternatively or additionally, the first device 1210 can receive such data and/or updates to the data from a server, as further illustrated in the next figures.

As illustrated in FIG. 12, the first device 1210 selects link 1232A and not the link 1230K for CSI transmissions (shown with an X over the link 1230K). Accordingly, the first device 1210 transmits CSI packets 1232A to the second device 1220 over the link 1230A according to a CSI packet period associated with the link 1230A.

Figure 13:
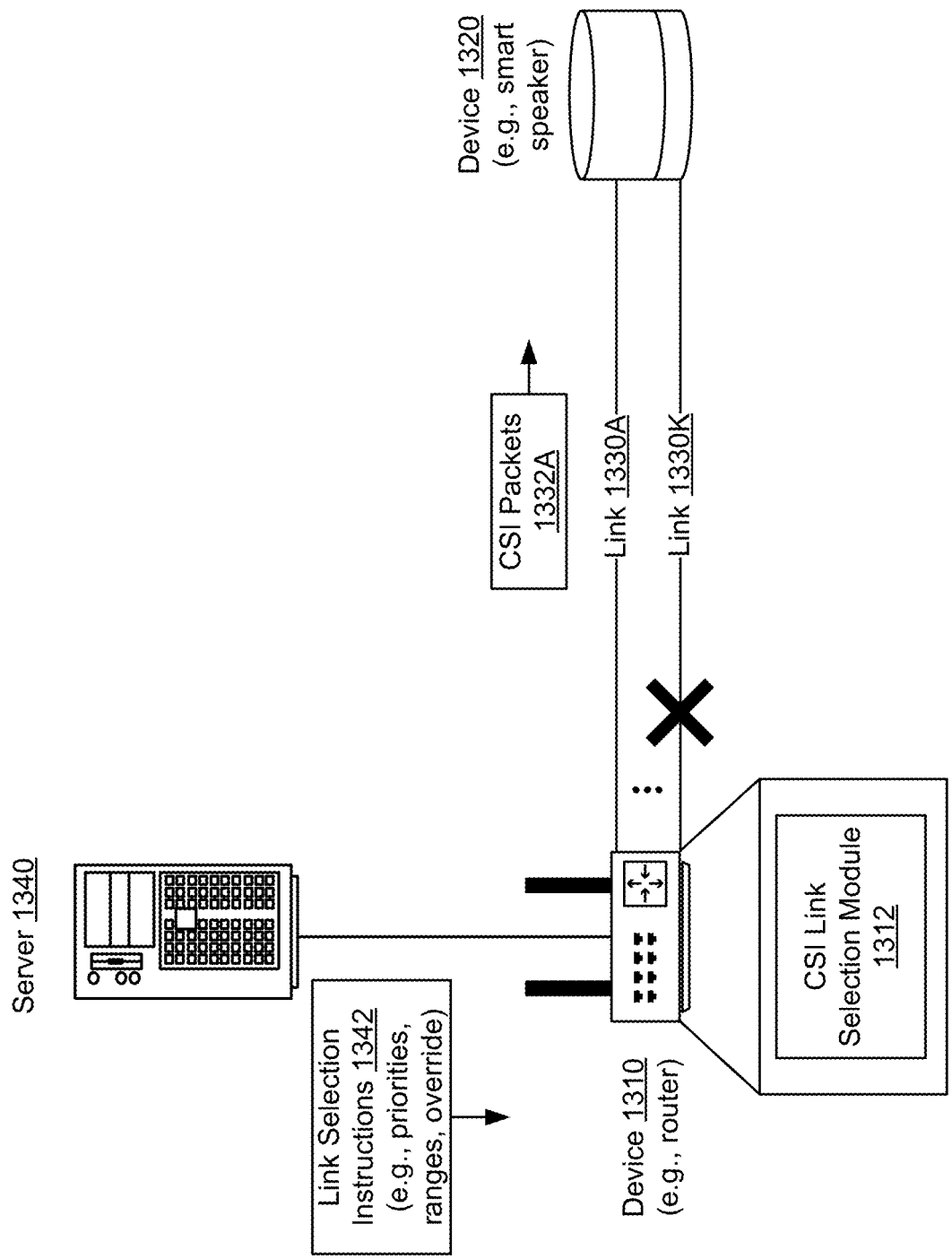
FIG. 13 illustrates another example of a selection of a link for CSI packet transmissions based on data of a server, according to embodiments of the present disclosure.

FIG. 13 illustrates another example of a selection of a link for CSI packet transmissions based on data of a server 1340, according to embodiments of the present disclosure. A first device 1310 and a second device 1320 are illustrated. Nonetheless, the embodiments of the present disclosure similarly apply to a larger number of connected devices. Multiple links 1330A through 1330K (for a total of "K" links) exist between the first device 1310 and the second device 1320 and can be used to transmit CSI packets, in addition to acknowledgements (ACKs) to the CSI packets and data packets. The first device 1310 and the second device 1320 are examples of the first device 1210 and the second device 1220, respectively, of FIG. 12. Each of the links 1330A through 1330K is an example of a link 130 of FIG. 1. The server 1340 is connected with the first device 1310 over one or more data networks including, for instance, the Internet. The server 1340 is an example of the server 340 of FIG. 3.

Here, the server 1340 sends data to the first device 1310 (shown as link selection instructions 1342) instructing the first device 1310 about the various parameters to use and their priorities and ranges, the number of links to select, and/or whether dynamic CSI packet periods are to be used.

This data can also include an override, by which the server 1340 identifies the subset of links that the first device 1310 is to use for the CSI transmissions regardless of what the first device 1310 may have selected otherwise. The server 1340 can generate the data and/or update to the data based on reports and/or application data received from the first device 1310, the second device 1320, and/or other devices.

In an illustration, the server 1340 of the link selection instructions 1342 are sent as a link quality matrix. The link quality matrix includes parameter identifiers to identify parameters to be used for the link quality assessment, priorities to identify the order of the comparison, and range to identify the similarities, and a time interval to identify a duration during which each parameter needs to be measured. An example of such a quality matrix is illustrated in Table 7 below, although a different data structure (e.g., a string, an array) can be similarly used.

TABLE 7

| Identifier | Priority | Range | Time Interval |
| --- | --- | --- | --- |
| PER | 1 | 10% | 1000 ms |
| PHY rate | 2 | 300% | 500 ms |
| RSSI | 3 | 10 db | 500 ms |

The above quality matrix indicates a range of values per parameter (e.g., a first range of values for the PER, referred to as a PER range of values; a second range of values for PHY rate, referred to as a PHY rate range of values, and a third range of values for the RSSI, referred to as an RSSI range of values). Each range of values indicates a similarity. If the difference or ratio between two parameters is within the range of values of the parameters, the two parameter are found to be similar. Otherwise, the two parameters are found to be dissimilar. If two parameters are similar, the link selection cannot be based on one of these two parameters. In this case, the selection considers two other parameters that are dissimilar.

Based on the above quality matrix, a CSI link selection module 1312 of the first device 1310 starts with the comparison of PERs of the links 1330A and 1330K given that the PER parameter has the highest priority. If the PER difference (or ratio) indicates that the PER of the link 1330A is lower than that of the link 1330K and is outside the PER range of values (e.g., more than ten percent), the CSI link selection module 1312 selects the link 1330A. If the PER difference (or ratio) indicates that the PER of the link 1330K is lower than that of the link 1330A and is outside the PER range of values (e.g., more than ten percent), the CSI link selection module 1312 selects the link 1330K. Otherwise, the PER is similar between the two links 1330A and 1330K, and the CSI link selection module 1312 proceeds to compare the PHY rates of the links 1330A and 1330K given that the PHY rate parameter has the next priority. Similarly here, if the PHY rate difference (or ratio) indicates that the PHY rate of the link 1330A is lower than that of the link 1330K and is outside the PHY rate range of values (e.g., more than three-hundred percent), the CSI link selection module 1312 selects the link 1330A. If the PHY rate difference (or ratio) indicates that the PHY rate of the link 1330K is lower than that of the link 1330A and is outside the PHY rate range of values (e.g., more than three-hundred percent), the CSI link selection module 1312 selects the link 1330K. Otherwise, the PHY rate is similar between the two links 1330A and 1330K, and the CSI link selection module 1312 proceeds to compare the RSSIs of the of links 1330A and 1330K. Here, given that the RSSI parameter has the lowest priority and no other parameters are to be further compared, the CSI link selection module 1312 selects the link that has the largest RSSI.

As illustrated in FIG. 13, the first device 1310 selects link 1332A and not the link 1330K for CSI transmissions (shown with an X over the link 1330K). Accordingly, the first device 1310 transmits CSI packets 1332A to the second device 1320 over the link 1330A according to a CSI packet period associated with the link 1330A.

Figure 14:
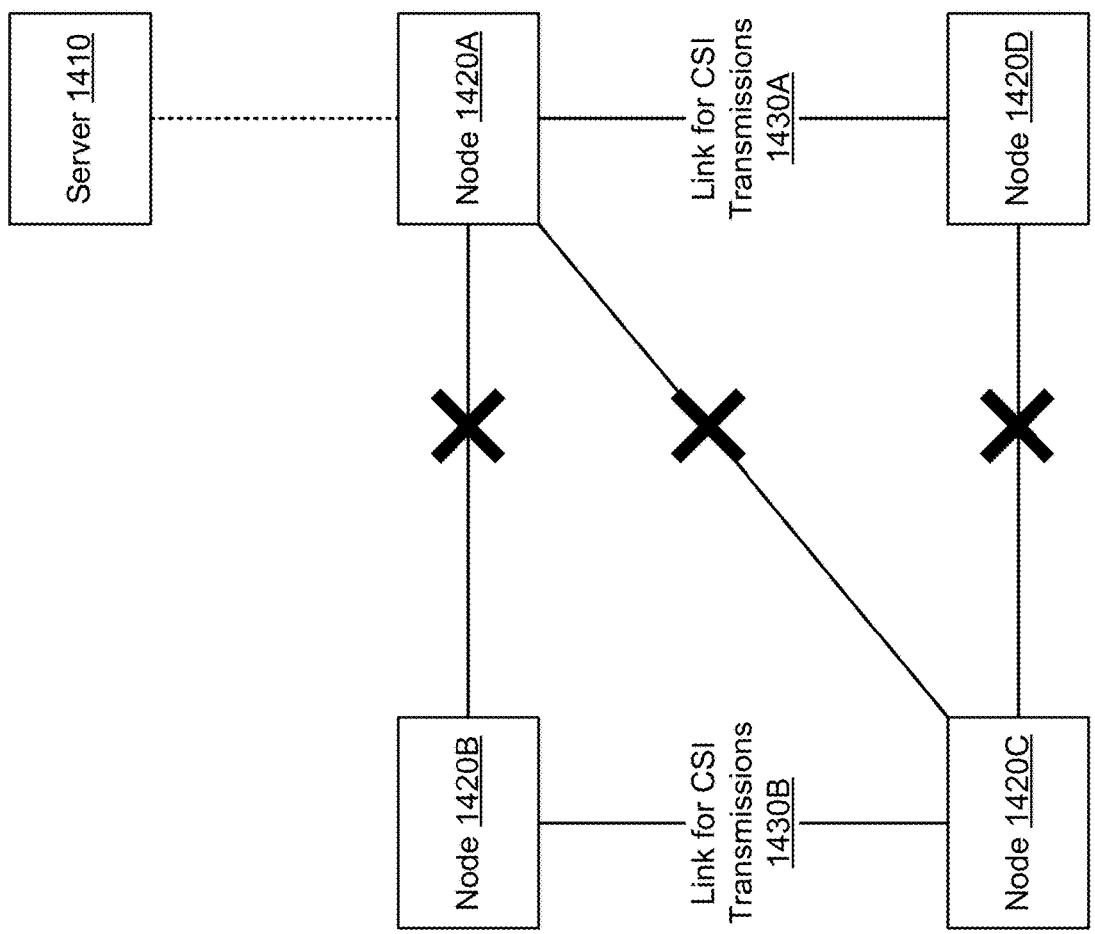
FIG. 14 illustrates an example of link selections in a mesh network, according to embodiments of the present disclosure.

FIG. 14 illustrates an example of link selections in a mesh network, according to embodiments of the present disclosure. In an example, a server 1410 is connected with the mesh network, such as with a node 1420A. In turn, the node 1420A is connected with a node 1420B, a node 1420C, and a node 1420D. In addition, the node 1420B is connected with the node 1420C, and the node 1420C is connected with the node 1420D. The nodes 1420A, 1420B, 1420C, and 1420D form the mesh network and each can be a wireless router. Of course, other network topologies of the mesh network are possible. Each of the connections can include one or more links.

In an example, each of the nodes 1420A, 1420B, 1420C, and 1420D may be transmitting CSI packets. At a node level, each of the nodes 1420A, 1420B, 1420C, and 1420D may select the link(s) to use for its CSI transmissions. The selection can follow the techniques described herein above in connection with FIGS. 12 and 13.

In another example, the link selection can be performed globally at a mesh network level. In particular, each of the nodes 1420A, 1420B, 1420C, and 1420D may send reports, application data, measured PERs, measures PHY rates, and/or measured RSSIs to the server 1410. In turn, the server 1410 may send data to each of the nodes 1420A, 1420B, 1420C, and 1420D instructing the node about the link(s) to use for its CSI transmissions. For instance, in the use case of mesh networks, the server 1410 may determine the minimum number of links to use such that each of the nodes 1420A, 1420B, 1420C, and 1420D participates in the CSI transmissions.

For instance, and as illustrated in FIG. 14, the server 1420 determines that it is sufficient to use a link between the node 1420A and the node 1420D for CSI transmissions 1430A on that link, and to use a link between the node 1420B and the nodes 1420C for CSI transmissions 1430B on that link. No other links may be needed. Here, these two links may be selected for having the best PERs, the best PHY rates, and/or the best RSSIs among the different links while also ensuring that all four nodes 1420A, 1420B, 1420C, and 1420D participate in CSI transmission. Accordingly, the server 1420 sends link selection instruction 1342 indicating to the nodes 1420A, 1420B, 1420C, and 1420D the selected links. Such instructions can override any other link selection made locally at a node level.

Figure 15:
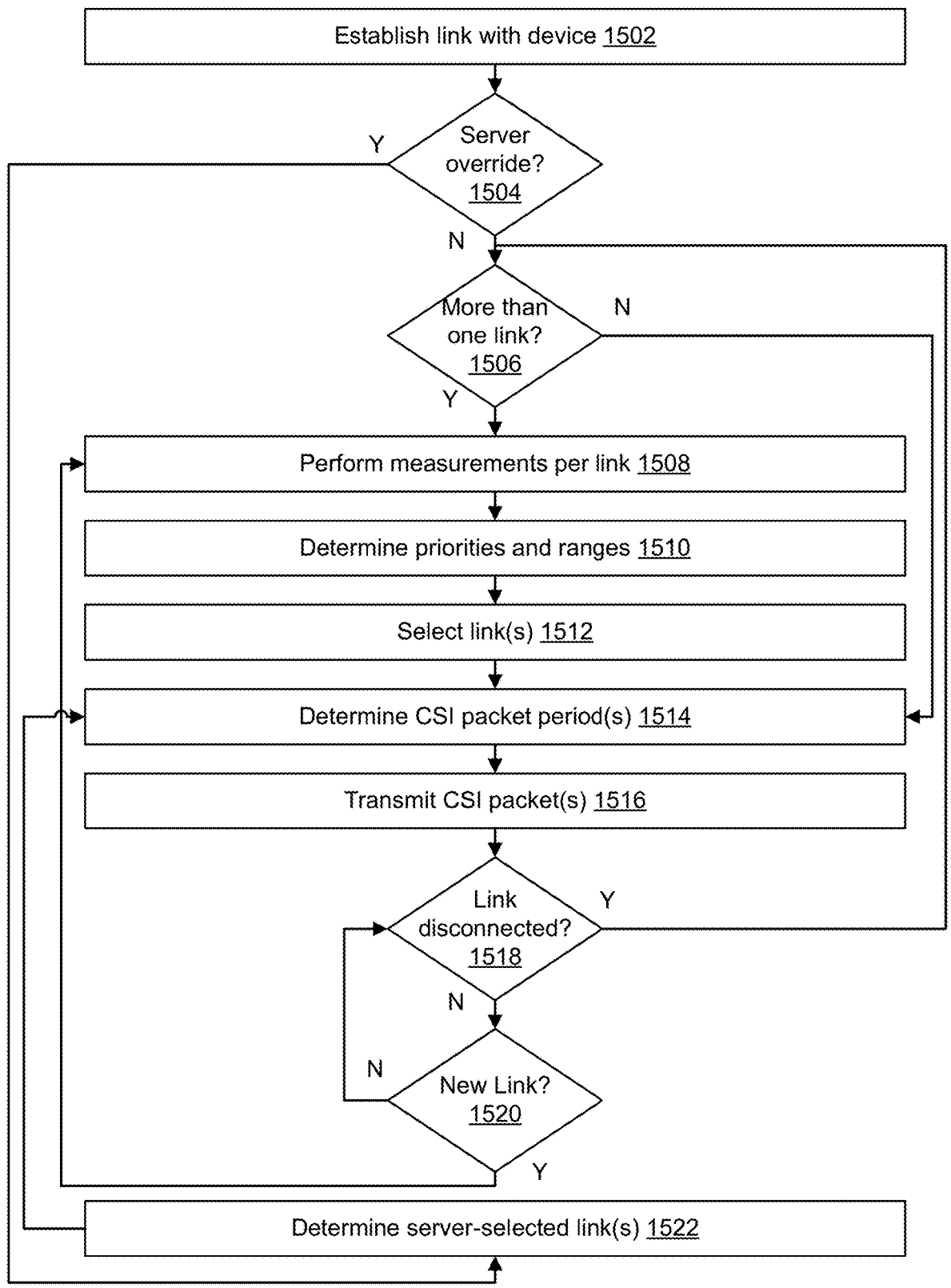
FIG. 15 illustrates an example of a flow of selecting a link for CSI packet transmissions, according to embodiments of the present disclosure.

FIG. 15 illustrates an example of a flow of selecting a link for CSI packet transmissions, according to embodiments of the present disclosure. Operations of the flow can be performed by a device, such as any of the devices described herein above. Some or all of the instructions for performing the operations of flows can be implemented as hardware circuitry and/or stored as computer-readable instructions on a non-transitory computer-readable medium of the device. As implemented, the instructions represent modules that include circuitry or code executable by processors of the device. The use of such instructions configures the device to perform the specific operations described herein. Each circuitry or code in combination with the relevant processor(s)

represent a means for performing a respective operation(s). While the operations are illustrated in a particular order, it should be understood that no particular order is necessary and that one or more operations may be omitted, skipped, performed in parallel, and/or reordered.

In an example, the flow includes operation 1502, where the device establishes a link with another device. For instance, the link is established between radios of the two devices and uses a frequency channel. Multiple links may exist between the two devices.

In an example, the flow also includes operation 1504, where the device determines whether a server override was received or not. For instance, a server is connected with the device over one or more data networks including the Internet. The server may send instructions to the device about using a particular set of links for its CSI transmissions. If so, operation 1522 follows operation 1504. Otherwise, the flow proceeds to operation 1506.

In an example, the flow also includes operation 1506, where the device has established more than one link with the other device. If only one link is established, no link selection is necessary. If so, operation 1514 follows operation 1506. Otherwise, the flow proceeds to operation 1508.

In an example, the flow also includes operation 1508, where the device performs measurements per link. Here, multiple links exist between the two devices and each of such links is a candidate link for CSI transmissions. Accordingly, the device determines parameters to measure (e.g., PER, PHY rate, and RSSI) from, for instance, a data structure pre-stored at the device or received from the server. For each of the candidate links, the device measures the parameters over a duration.

In an example, the flow also includes operation 1510, where the device determines priorities and ranges of the parameters. For instance, the data structure also indicates the relative priorities between the parameters (e.g., the PER having a higher priority than the PHY rate, and the PHY rate having a higher priority than RSSI) and the range for each parameter (e.g., a PER range, a PHY rate range, and a RSSI range) usable to determine similarities.

In an example, the flow also includes operation 1512, where the device selects a number of links. The desired number may be also indicated by the data structure. In addition, the device compares the measurements of the parameters, starting with the parameters having the highest priority and moving to the next priority levels when the measurements are similar. For instance, the device compares the PER of two links. If the PER difference is within the packet error range, the device compares the PHY rate of the two links. If the PHY rate difference is within the PHY rate range, the device proceeds to compare the RSSI of the two links. Based on the comparisons, the device selects the link(s) having the best PER, PHY rate, and/or RSSI.

In an example, the flow also includes operation 1514, where the device determines the CSI packet period (and/or a new resource configuration for CSI packet transmission) per selected link. In one illustration, the CSI packet period is pre-set as a fixed time interval. In another illustration, the CSI packet period (and/or a new resource configuration for CSI packet transmission) is dynamically determined, as described herein above.

In an example, the flow also includes operation 1516, where the device transmits a CSI packet over each selected link at the CSI packet period determined for the link. This transmission can be repeated over time at the CSI packet period and the CSI packet period. Upon a change to the conditions of the link, the CSI packet period can be adjusted or the link selection may be restarted (e.g., by looping back to operation 1508).

In an example, the flow also includes operation 1518, where the device determines whether a selected link has been disconnected. If so, operation 1506 follows operation 1518 to restart the link selection. Otherwise, the flow proceeds to operation 1520.

In an example, the flow also includes operation 1520, where the device determines whether a new link has been established with the other device. If so, operation 1508 follows operation 1520 to restart the link selection. Otherwise, the flow loops back to operation 1518.

In an example, the flow also includes operation 1522, where the device has received override data from the server. Here, the device may not perform operations 1506-1520. Instead, the device proceeds with using the server-selected link(s) for its CSI transmissions.

Figure 16:
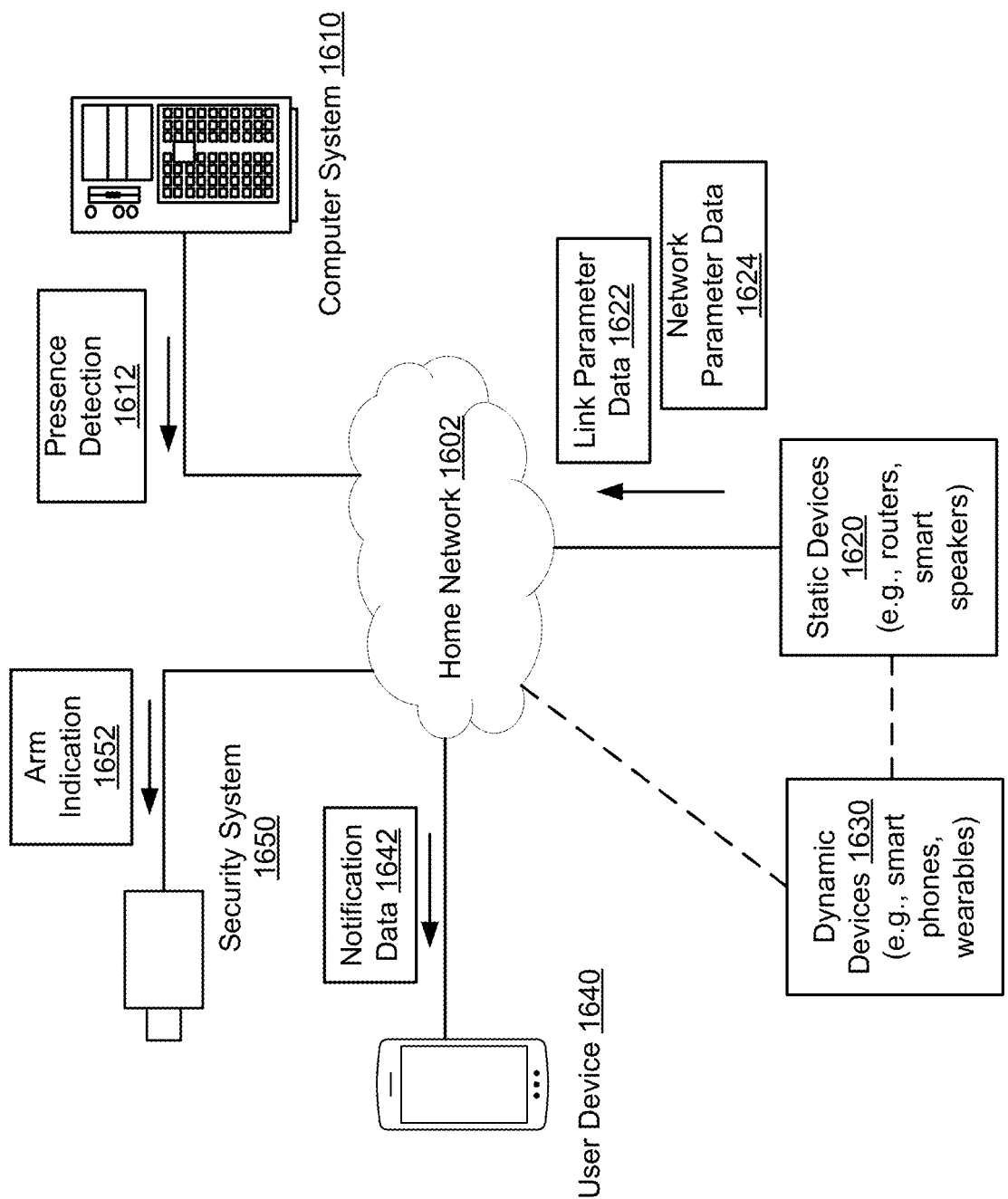
FIG. 16 illustrates an example of a computing environment for performing presence detection based on connected devices, according to embodiments of the present disclosure.

FIG. 16 illustrates an example of a computing environment performing presence detection based on connected devices, according to embodiments of the present disclosure. In an example, the computing environment includes a network of connected devices, such as a home network 1602. The home network 1602 can be a group of devices connect to the Internet and to each other. Different topologies of the home network 1602 are possible, including a mesh network topology, such as the one illustrated in FIG. 9. Presence detection represents a detection of presence of a human, pet, or any object movable within a location where the network is installed.

Within the computing environment, the home network 1602 connects static devices 1620 and dynamic devices 1630 that belong to or join the home network 1602 with a computer system 1610 over one or more private or public networks (e.g., the Internet). Further, the home network 1602 connects a user device 1640 and a security system 1650 with the computer system 1610 and, optionally, with one or more of the static devices 1620 or dynamic devices 1630. Static devices 1620 can include devices that remain connected to the home network 1602 over time. For example, the static devices 1620 can be routers, Internet of Things (IoT) devices, and smart speakers. Dynamic devices 1630 can include devices that can disconnect and reconnect to (e.g., join and leave) the home network 1602 over time. For example, smart phones, tablets, and wearable devices are examples of dynamic devices 1630. The dynamic devices 1630 connect to a static device or to an access point of the home network 1602. The static devices 1620 and dynamic devices 1630 can also, but need not, be connected in a peer-to-peer topology, a mesh topology, a star topology, or the like.

The static devices 1620 and dynamic devices 1630 transmit link parameter data 1622 and network parameter data 1624 to the computer system 1610 via the home network 1602 (e.g., via a root node or a router of the home network 1602). The dynamic devices 1630 can transmit their data directly via the home network 1602, or the dynamic devices 1630 can transmit their data via the static devices 1620 and on to the home network 1602. The link parameter data 1622 can include any of congestion of packet transmission per link (e.g., a value of the congestion), CSI information, and a type of network association per device. The network parameter data 1624 can include any of a number of network connections per device, a network connection type per device, an indication of network association per device, or a RSSI value per device. In an example, the link parameter data 1622 and network parameter data 1624 are received as files. Data in each file can include timestamps, and/or the files themselves can be timestamped to support time synchronization of the data to be processed across the different devices of the computer network.

The network parameter data 1624 can include an identifier of a device (e.g., such as a device serial number (DSN)), the MAC address of the radio, a device type to identify the type of the device (e.g., router, phone, smart speaker, tablet, etc.), a start time of an activity (e.g., a start timestamp, where the activity can relate to the transmission and/or reception of CSI packets), an end time of the activity (e.g., an end timestamp), a CSI binary file of CSI values, and an average RSSI value over a period of time (e.g., fifteen seconds). An example of such network parameter data 1624 is illustrated in Table 8 below, although a different data structure (e.g., a string, an array, or the like) can be similarly used.

TABLE 8

| DSN | MAC Address | Device Type | Start Timestamp | End Timestamp | CSI Binary File | Average RSSI Value |
|---|---|---|---|---|---|---|
| D0001 | 00:00:00:00:00:01 | 1 | 1589042431 | 1589042531 | A_t1_1.csi | −55 |
| D0002 | 00:00:00:00:00:02 | 3 | 1589042251 | 1589042441 | B_t2_7.csi | −67 |
| D0002 | 00:00:00:00:00:02 | 3 | 1589042251 | 1589042441 | C_t3_18.csi | −65 |
| D0003 | 00:00:00:00:00:03 | 2 | 1589042541 | 1589042561 | D_t4_14.csi | −59 |

The link parameter data 1622 can include an identifier of a device (e.g., DSN), the MAC address of the radio, a device type to identify the type of the device, a start time of an activity (e.g., a start timestamp of an activity related to access to the computer network, such as an association to the computer network, a dissociation from the computer network, transmission of data via the computer network, reception of data via the computer network, etc.), an end time of the activity (e.g., an end timestamp), a state of the activity (e.g., transmission activity, reception activity, association activity, disassociation activity, etc.), and a traffic type of the activity (e.g., Bluetooth low energy voice, control, User Datagram Protocol video, etc.). An example of such link parameter data 1622 is illustrated in Table 9 below, although a different data structure (e.g., a string, an array, or the like) can be similarly used.

TABLE 9

| DSN | MAC Address | Device Type | Start Timestamp | End Timestamp | State | Traffic Type |
|---|---|---|---|---|---|---|
| D0001 | 00:00:00:00:00:01 | 1 | 1589042431 | 1589042531 | transmission | Voice, BLE |
| D0002 | 00:00:00:00:00:02 | 3 | 1589042251 | 1589042441 | Association | Control |
| D0002 | 00:00:00:00:00:02 | 3 | 1589042251 | 1589042441 | Disassociation | Control |
| D0003 | 00:00:00:00:00:03 | 2 | 1589042541 | 1589042561 | Reception | UDP, Video |

In another example, the link parameter data 1622 can include the identifier of the device, the MAC address of the radio, channel, the start time and the end time of the measurements, and the channel airtime load. An example of such link parameter data 1622 is illustrated in Table 10 below, although a different data structure (e.g., a string, an array, or the like) can be similarly used.

TABLE 10

| DSN | MAC Address | Channel | Start Timestamp | End Timestamp | Load |
|---|---|---|---|---|---|
| D0001 | 00:00:00:00:00:01 | 1 | 1589042431 | 1589042531 | 23% |
| D0002 | 00:00:00:00:00:02 | 6 | 1589042251 | 1589042441 | 12% |
| D0002 | 00:00:00:00:00:02 | 40 | 1589042251 | 1589042441 | 5% |
| D0003 | 00:00:00:00:00:03 | 40 | 1589042541 | 1589042561 | 7% |

The link parameter data 1622 and network parameter data 1624 are transmitted over the home network 1602 to the computer system 1610. The computer system 1610 includes one or more processors, one or more memories storing computer-readable instructions, one or more network interfaces, and/or other computing components for performing presence detection 1612, as further illustrated in FIG. 17.

The computer system 1610 processes the link parameter data 1622 and the network parameter data 1624 using prediction models to determine a prediction of presence in the home. A prediction of presence is an example of a likelihood of presence. The likelihood can be a percentage or a probabilistic value indicating whether the presence is detected. In comparison, a prediction of the presence can include one or more of the likelihood of the presence or a descriptive indication of the presence detection. The descriptive indication can be determined based on the likelihood and can be a binary indication (e.g., detected or not detected), an indication from predefined candidate detections (e.g., present, away, unknown), or a qualitative description (e.g., likely present, likely not present). When the likelihood is compared to a likelihood threshold, the result of the comparison can define the descriptive indication (e.g., when the likelihood is larger than the likelihood threshold, the prediction is that the presence is detected). The prediction models can be metrics-based models and machine-learning models. Each prediction model can be used to determine a likelihood of the presence, or similarly, the prediction of the presence. In various embodiments described herein, the predictions models are described in connection with determining a presence prediction. The embodiments similarly apply to determining a likelihood of presence.

The computer system 1610 transmits data about a prediction of the presence detection 1612 over the home network 1602. The prediction data of the presence detection 1612 can cause one or more responses at other devices. In an example, the prediction data is received by the user device 1640 as notification data 1642, causing the user device 1640 to generate and output a notification about the presence detection 1612 (e.g., an audible or visual notification about whether the presence is detected or not). For instance, based on the presence detection 1612, the notification data 1642 indicates that a person is present in the vicinity of any device of the home network 1602. In an additional example, the prediction data is received by the security system 1650 as an arm indication 1652, causing the security system to arm or disarm (e.g., to be activated) based on the presence detection 1612. To illustrate, the presence detection 1612 indicates users are away. The arm indication 1652 arms the security system 1650 based on the presence detection 1612 indicating users are away.

Figure 17:
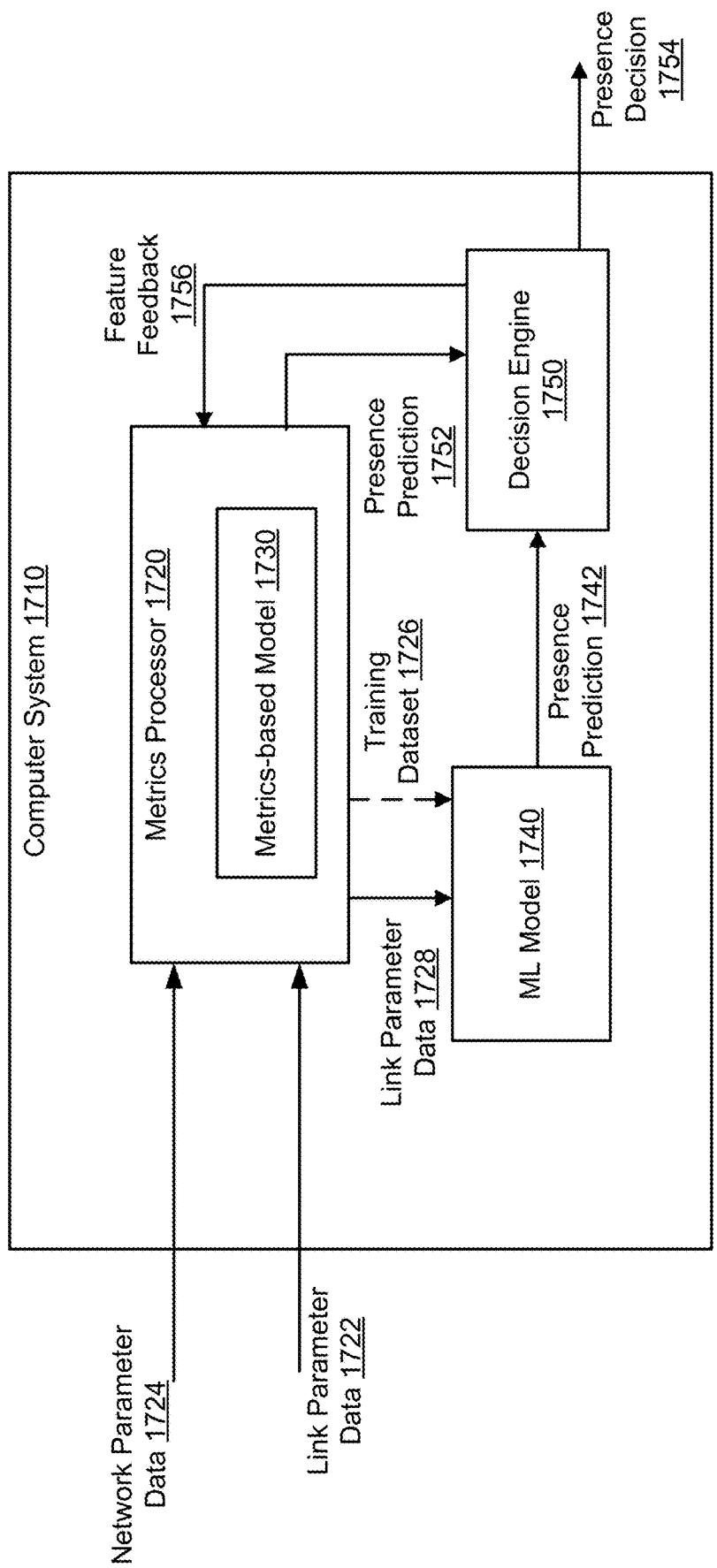
FIG. 17 illustrates an example of components of a computer system for performing presence detection, according to embodiments of the present disclosure.

FIG. 17 illustrates an example of components of a computer system 1710 for performing presence detection, according to embodiments of the present disclosure. The computer system 1710, such as the computer system 1610 of FIG. 16, includes components for processing data and determining a presence prediction. The computer system 1710 receives data from a network (also referred to as a computer network) that includes multiple devices present at a location, such as the home network 1602 of FIG. 16.

In an example, the computer system 1710 includes a metrics processor 1720, a machine-learning (ML) model 1740, and a decision engine 1750 that can be communicatively coupled via one or more data buses. Each of these computing components can be implemented in hardware or as software code executing on hardware and is described herein next.

The metrics processor 1720 supports receiving data and executing a metrics-based model 1730 for determining a presence prediction 1752. The metrics processor 1720 receives network parameter data 1724 and link parameter data 1722 from one or more devices of the computer network. Each device can be a static device (e.g., a router or smart speaker) or a dynamic device (e.g., smart phone or wearable). The network parameter data 1724 includes data about the network, such as any of a number of network connections per device of the network, a network connection type per device, an indication of network association per device, or a RSSI value per device. The link parameter data 1722 includes data about one or more links per device of the network. Some of the link parameter data of a device relate to a CSI packet sent by the device, such as being data about measurements performed or an acknowledgment packet received by the device in response to the transmission of the CSI packet. The link parameter data 1722 includes, for instance, any of congestion of packet transmission per link, CSI information, and a type of network association per device.

The metrics processor 1720 inputs the network parameter data 1724 into the metrics-based model 1730. The metrics-based model 1730 is a prediction model for determining a prediction of presence at the location. In an example, the metrics processor 1720 inputs at least the RSSI value of the network parameter data 1724 into the metrics-based model 1730. The metrics-based model 1730 is set-up based at least in part on presence predictions output by a second prediction model (e.g., ML model 1740). The presence predictions from the second prediction model are based at least in part on historical values of the link parameter data 1722 (e.g., training data) associated with a link between two devices connected to the computer network. The metrics-based model 1730 can compare at least the RSSI value to a RSSI threshold to determine the presence prediction 1752. For example, an RSSI value above the RSSI threshold corresponds to presence at the location. Operations of the metrics-based model 1730 are further described in FIGS. 21 and 22.

The computer system 1710 determines whether presence is detected at the location based on an output of the metrics-based model 1730. The output of the metrics-based model is a first prediction of presence. For example, the output can be the presence prediction 1752 indicating presence or no presence for the location. The metrics processor 1720 outputs the presence prediction 1752 to a decision engine 1750. The presence prediction 1752 is associated with a confidence value. For example, the presence prediction 1752 can indicate there is presence at the location with a confidence value of fifty percent (or some other confidence value).

The computer system 1710 includes the ML model 1740 for generating a second presence prediction 1742 for the location. The ML model 1740 can be implemented as a neural network that is initially configured (e.g., trained) offline and that can be subsequently configured based on predictions of the metrics-based model 1730 (where these predictions are used a ground truth labels) and associated link parameter data 1722. Link parameter data 1728 from the metrics processor 1720 is input into the ML model 1740. The link parameter data 1728 may, but need not, be the same as the link parameter data 1722. In an example, at least the CSI value of the link parameter data 1728 is input into the ML model 1740.

In an example, offline training involves a training dataset that includes historical values of one or more parameters associated with the computer network, including one or more parameters associated with links of devices of the computer network, such historical values of link parameter data including any of historical values about congestion of packet transmission per link of a computer network, historical CSI information, and historical type of network association per device. A historical value is a value that was previously observed or measured and is known, and that may be associated or contribute to a known prediction. For instance, in a supervised training approach, a historical value can be associated with a ground truth label. As further described herein above, the training can be repeated over time, even after the ML model 1740 is deployed. In this case, a value of a link parameter can be added to a training dataset and, by doing so, becomes a historical value. A prediction of the metrics-based model 1730 can be added to this training data as a ground truth label associated with the historical value.

The computer system 1710 determines whether presence is detected at the location based on an output of the ML model 1740. The output of the ML model is the presence prediction 1742. For example, the presence prediction 1742 can include an indication of presence or no presence for the location. The ML model 1740 outputs the presence prediction 1742 to the decision engine 1750. The presence prediction 1742 is associated with a confidence value. For example, the presence prediction 1742 can indicate there is presence at the location with a confidence value of eighty percent (or some other confidence value).

The computer system 1710 includes the decision engine 1750 for determining a presence decision 1754 for the location. The decision engine 1750 determines the presence decision 1754 based on the presence prediction 1752 from the metrics processor 1720 and the presence prediction 1742 from the ML model 1740. If the presence prediction 1752 and the presence prediction 1742 agree (e.g., both indicate presence or both indicate no presence (no presence can also be referred to as "away")), the decision engine 1750 outputs the presence decision 1754 as the same as the predictions. To illustrate, if the presence prediction 1752 and the presence prediction 1742 both indicate presence at the location, the decision engine 1750 the presence decision 1754 also indicate presence at the location.

In an example in which the presence prediction 1752 and the presence prediction 1742 do not agree, the decision engine 1750 performs operations to generate the presence decision 1754. The decision engine 1750 determines a first weight for the presence prediction 1752 based on the confidence value associated with the presence prediction 1752. The decision engine 1750 also determines a weight for the presence prediction 1742 based on the confidence value associated with the presence prediction 1742. Generally, the higher the confidence value is, the larger the weight may be. In addition, the weights can be set depending on each other. An example of determining the weights is further illustrated in FIG. 23. For instance, the presence prediction 1752 is determined with a ninety-five percent confidence value. In comparison, the presence prediction 1742 is determined with a thirty percent confidence value. These two confidence values are compared to a fifty percent threshold to determine weights. Based on the comparisons, the weight of the presence prediction 1752 is set to 0.8, whereas the weight of the presence prediction 1742 is set to 0.2. The confidence value of the presence prediction 1752 is adjusted to 0.95× 0.8=0.76 (or seventy-six percent). Similarly, the confidence value of the presence prediction 1742 is adjusted to 0.3× 0.2=0.06 (or six percent). The two adjusted confidence values are combined, resulting in a confidence level of 0.76–0.06=0.70 (or seventy percent). This seventy percent confidence value is compared to a threshold value (e.g., sixty-five percent). Because the confidence value exceeds this threshold value, a determination is made that the presence is detected.

Based on the weighing of the confidence values with the weights, the decision engine 1750 generates the presence decision 1754. For example, the decision engine 1750 determines that the presence prediction 1742 should be the presence decision 1754 because the presence decision 1754 has the highest weight and/or its weighted confidence value exceeds a predefined threshold.

In an example, the decision engine 1750 provides feature feedback 1756 to the metrics processor 1720. The feature feedback 1756 includes information about devices on the computer network, for which network parameter data is collected and used in generating the presence prediction 1752. The feature feedback 1756 can be based on outputs of the ML model 1740 and can be used to configure the metrics-based model 1730. For example, the metrics processor 1720 uses the feature feedback 1756 to filter the network parameter data 1724 from the devices and/or to change settings related to the processing of the network parameter data 1724. For example, the feature feedback 1756 can flag a device in the computer network, for which the collected data typically results in incorrect presence predictions. The metrics processor 1720 can filter the network parameter data 1724 to ignore network parameter data from the flagged device when generating the presence prediction 1752.

The computer system 1710 can further configure the ML model 1740 based on outputs of the metrics-based model 1730. In an example where the presence predictions 1752 and 1742 are different, the computer system 1710 trains the ML model 1740 based on determining that the confidence value of the presence prediction 1752 from the metrics-based model 1730 is above a confidence threshold and that the confidence value of the presence prediction 1742 is below the confidence threshold. A training dataset 1726 can be generated including link parameter data (e.g., historical values of link parameters that have been added to the training dataset 1726) and labels of the presence predictions of the metrics-based model 1730. The training dataset 1726 is generated based at least in part on the confidence values and the confidence threshold.

In an example where the presence predictions 1752 and 1742 are the same, the computer system 1710 trains the ML model 1740 based on determining that the confidence value of the presence prediction 1742 is smaller than the confidence value of the presence prediction 1752 from the metrics-based model 1730. The training dataset 1726 includes link parameter data labeled with the presence predictions of the metrics-based model 1730. The training dataset 1726 is generated based on the confidence values and includes historical values of link parameters.

In another example where the presence predictions 1752 and 1742 are different, the computer system 1710 trains the ML model 1740 based on determining that the presence prediction 1752 is confirmed. The presence prediction 1752 can be confirmed based on sensor data generated from one or more sensors installed at the location. For example, a security system may be installed at the location. Sensors of the security can detect presence and confirm the presence prediction 1752 of presence. The training dataset 1726 includes labeled link parameter data (e.g., historical values of link parameters and associated ground truth labels) and is generated based on determining that the presence prediction 1752 is confirmed.

Various triggers can be used to further train the ML model 1740. For instance, the computer system 1710 further trains the ML model 1740 based on determining at least one of a change to a total number of devices that belong to the network or a change to a type of a device added to the network. The training dataset 1726 can be input to the ML model 1740 based on any or both changes.

In another example of a trigger, the computer system 1710 further trains the ML model 1740 based on determining confidence values associated with historical predictions of the ML model 1740 are smaller than a confidence threshold. The training dataset 1726 is input to the ML model 1740 based at least in part on the confidence values.

Figure 18:
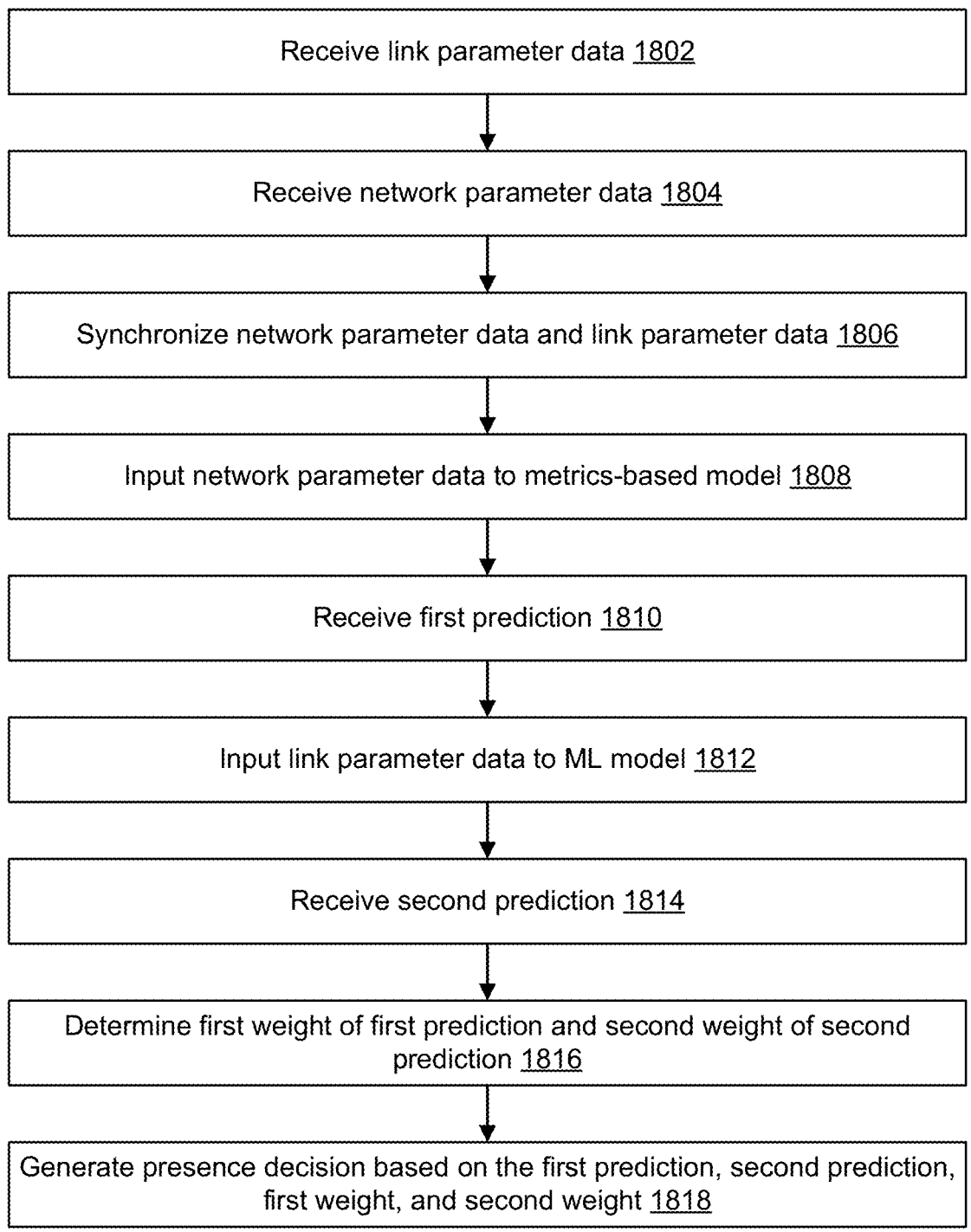
FIG. 18 illustrates an example of a flow of performing presence detection using prediction models, according to embodiments of the present disclosure.

FIGS. 18-23 illustrate examples of flows for determining a presence decision. Operations of the flow can be performed by a computer system, such as any of the computer systems described herein above. Some or all of the instructions for performing the operations of flows can be implemented as hardware circuitry and/or stored as computer-readable instructions on a non-transitory computer-readable medium of the computer system. As implemented, the instructions represent modules that include circuitry or code executable by processors of the computer system. The use of such instructions configures the computer system to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

FIG. 18 illustrates an example of a flow of performing presence detection using prediction models, according to at least one embodiment of the present disclosure. Here, the processing is performed by a computer system, such as computer system 1710, that is connected to a computer network.

In an example, the flow includes operation 1802, where the computer system receives link parameter data. The link parameter data includes data indicating a value associated with a parameter of a link between devices on the computer network. For example, the link parameter data can include any of congestion of packet transmission per link, CSI information, and a type of network association per device. The link parameter data received from a device can be sent by the device as a file.

In an example, the flow includes operation 1804, where the computer system receives network parameter data. The network parameter data includes data indicating a value associated with a parameter of the computer network. For example, the network parameter data can include any of a number of network connections per device, a network connection type per device, an indication of network association per device, or a RSSI value per device. The network parameter data received from a device can be sent by the device as a file.

In an example, the flow includes operation 1806, where the computer system synchronizes the network parameter data and the link parameter data. For instance, the received files include timestamps or are timestamped upon receipt. The timestamps for the network parameter data and link parameter data can be matched to synchronize the data. Synchronizing the data can ensure that a first prediction model receiving the network parameter data and a second prediction model receiving the link parameter data make predictions based on data from the same time period.

In an example, the flow includes operation 1808, where the computer system inputs the network parameter data to a metrics-based model. The computer system inputs at least an RSSI value of the network parameter data to the metrics-based model.

In an example, the flow includes operation 1810, where the computer system receives a first prediction. The first prediction is an output of presence or no presence as determined by the metrics-based model. For example, the metrics-based model can compare the RSSI value to an RSSI threshold. The metrics-based model can determine there is presence based on the RSSI value exceeding the RSSI threshold. A first confidence value is associated with the first prediction.

In an example, the flow includes operation 1812, where the computer system inputs the link parameter data to a ML model. The ML model is a neural network, and the computer system inputs at least a CSI value of the link parameter data into the ML model.

In an example, the flow includes operation 1814, where the computer system receives a second prediction. The second prediction is an output of presence or no presence as determined by the ML model. A second confidence value is associated with the second prediction.

In an example, the flow includes operation 1816, where the computer system determines a first weight of the first prediction and a second weight of the second prediction. The first weight is based at least in part on the first confidence value associated with the first prediction. The first weight is determined from a first number of weights associated with the metrics-based model. The second weight is based at least in part on the second confidence value associated with the second prediction. The second weight is from a second number of weights associated with the ML model.

In an example, the flow includes operation 1818, where the computer system generates a presence decision based on the first prediction, second prediction, first weight, and second weight. If the first prediction and second prediction are the same, the presence decision is the same. For example, if the first prediction and second prediction both indicate presence, the presence decision is presence at the location. If the first prediction and second prediction are different, the computer system can generate the presence decision based on the first weight and second weight. For example, the computer generates the presence decision by weighing the first confidence value according to the first weight and the second confidence value according to the second weight.

Figure 19:
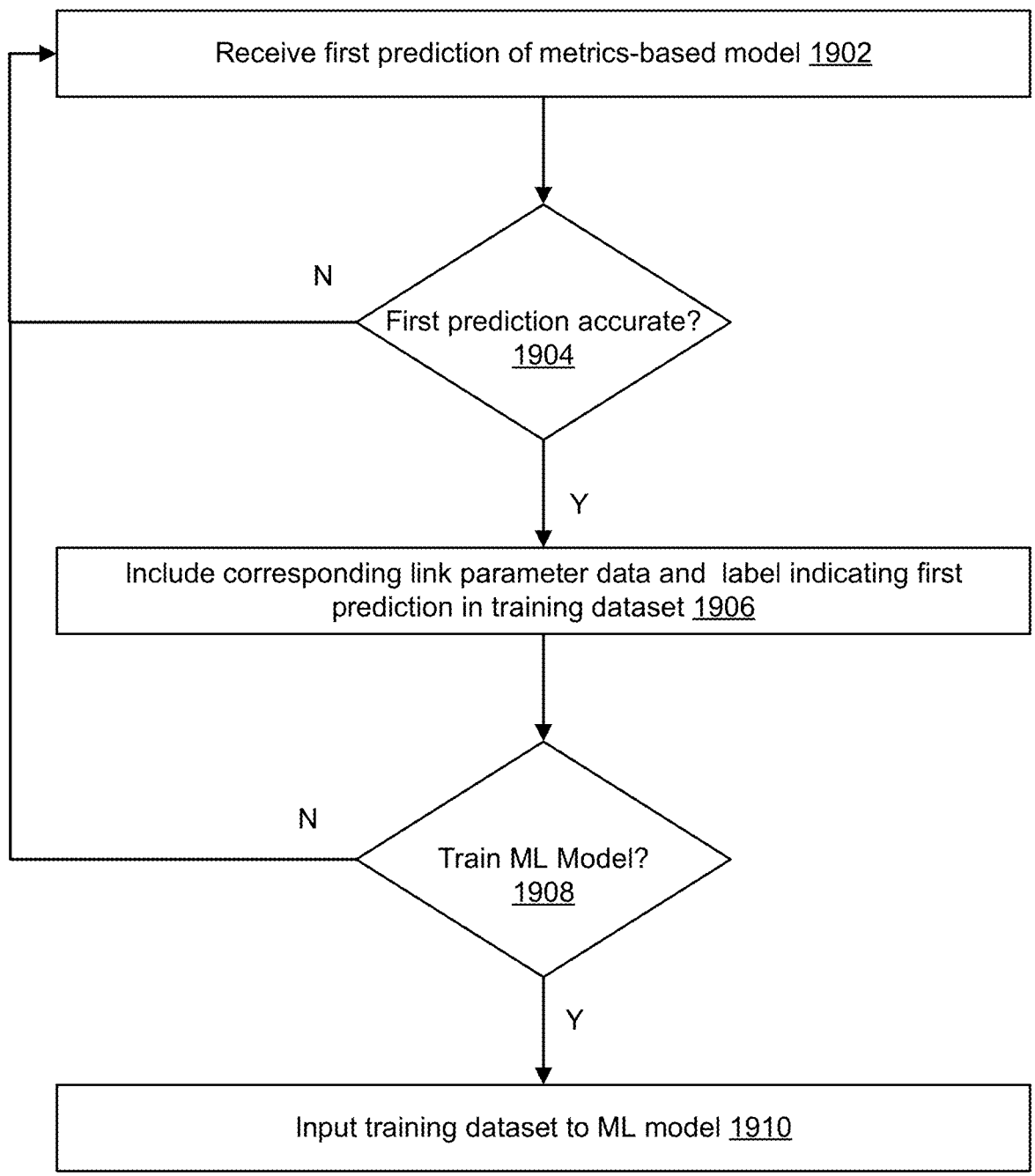
FIG. 19 illustrates an example of a flow of training a machine-learning model based on outputs from a metrics-based model, according to embodiments of the present disclosure.

FIG. 19 illustrates an example of a flow of training a machine-learning model based on outputs from a metrics-based model, according to embodiments of the present disclosure. Here, the processing is performed by a computer system that is connected to a computer network at a location.

In an example, the flow includes operation 1902, where the computer system receives a first prediction of a metrics-based model. The metrics-based model can receive network parameter data for the computer network. The metrics-based model can generate the first prediction of presence based on the network parameter data.

In an example, the flow includes operation 1904, where the computer system determines whether the first prediction is accurate. The computer system can determine the first prediction is accurate based on the confidence value associated with the first prediction being greater than a confidence threshold. The computer system can also determine the first prediction is accurate based on the first prediction and a second prediction from a ML model being the same. Additionally, the computer system can determine the first prediction is accurate based on sensor data generated from one or more sensors installed at the location. If so, operation 1906 follows operation 1904. If the computer system determines the first prediction is inaccurate, the computer system loops back to operation 1902.

In an example, the flow includes operation 1906, where the computer system includes corresponding link parameter data and a label indicating the first prediction in a training dataset. The link parameter data corresponds to the link parameter data at the time that the metrics-based model made the first prediction. The training dataset can include the link parameter data and label based on the first confidence value, a second confidence value associated with the second prediction, and the confidence threshold.

In an example, the flow includes operation 1908, where the computer system determines whether to train the ML model. The computer system determines to train the ML model based on determining the first prediction (from the metrics-based model) and the second prediction (from the ML model) are different, the first confidence value is greater than the confidence threshold, and the second confidence value is smaller than the confidence threshold. The computer system also determines to train the ML model based on determining the first prediction and the second prediction are the same and the first confidence value is greater than the second confidence value. Additionally, the computer system determines to train the ML model based on a change to a total number of devices that belong to the computer network or a type of device added to the computer network or based on confidence values associated with historical predictions of the second prediction being smaller than the confidence threshold. If any of the conditions are met, operation 1910 follows operation 1908. If not, the computer system loops to operation 1902.

In an example, the flow includes operation 1910, where the computer system inputs the training dataset to the ML model. The computer system inputs the training dataset to the ML model based on determining to train the ML model. The ML model is trained with the labeled link parameter data.

Figure 20:
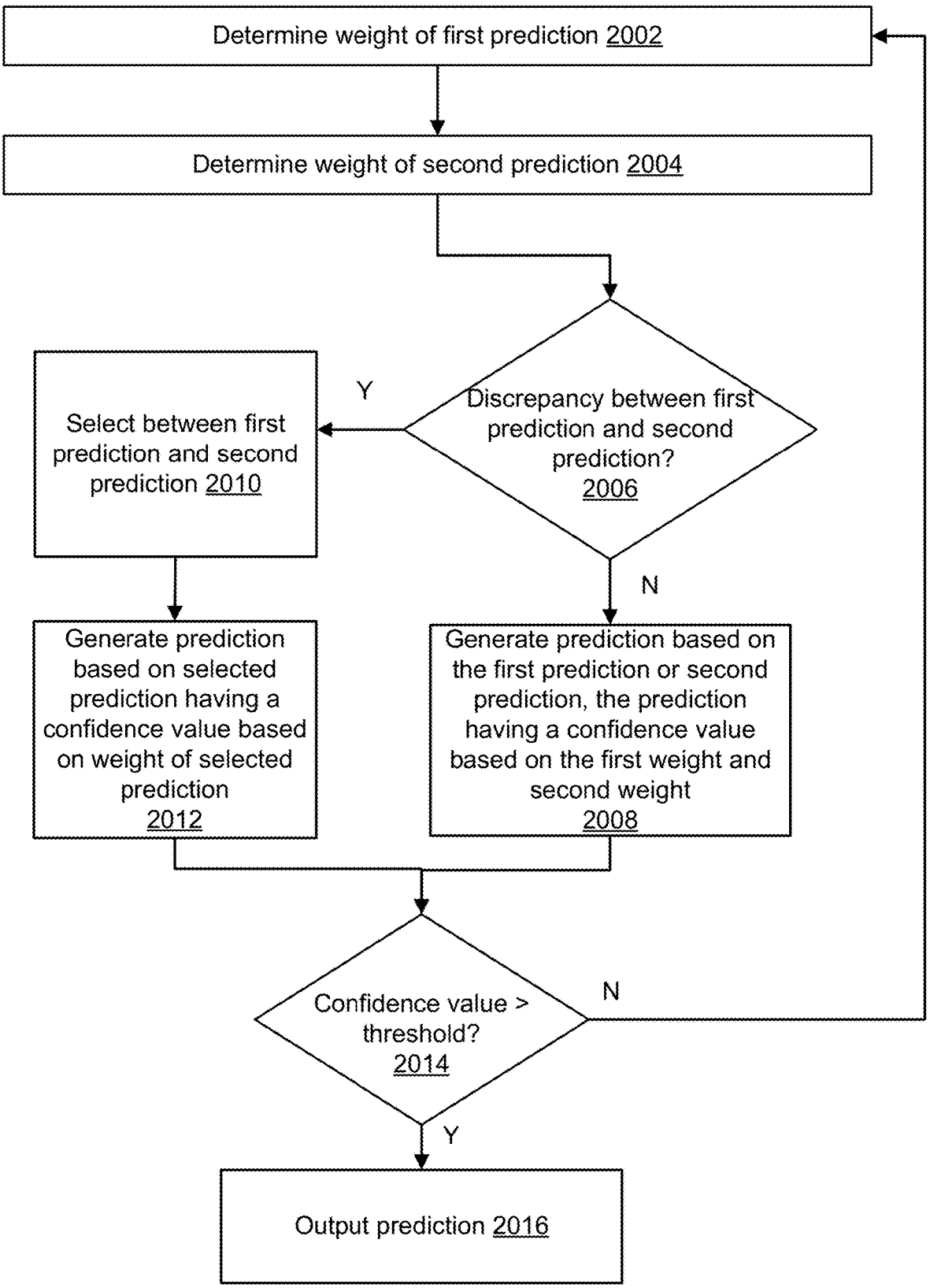
FIG. 20 illustrates an example of a flow of determining a presence prediction based on confidence values and weights associated with prediction models, according to embodiments of the present disclosure.

FIG. 20 illustrates an example of a flow of determining a presence decision based on confidence values and weights associated with prediction models, according to embodiments of the present disclosure. Here, the processing is performed by a computer system that is connected to a computer network at a location.

In an example, the flow includes operation 2002, where the computer system determines a weight of a first prediction. The first prediction is a prediction of presence (e.g., presence or no presence) from a metrics-based model and is associated with a first confidence value. The computer system determines the weight of the first prediction by comparing the first confidence value to a first threshold value.

In an example, the flow includes operation 2004, where the computer system determines a weight of a second prediction. The second prediction is a prediction of presence from a ML model and is associated with a second confidence value. The computer system determines the weight of the second prediction by comparing the second confidence value to a second threshold value.

In an example, the flow includes operation 2006, where the computer system determines whether there is a discrepancy between the first prediction and the second prediction. The computer system compares the presence prediction of the first prediction and the second decision to determine whether there is a discrepancy. For example, the computer system determines the first prediction predicts presence and the second prediction predicts no presence. If there is a discrepancy, operation 2010 follows operation 2006. If not, the flow continues to operation 2008.

In an example, the flow includes operation 2008, where the computer system generates a prediction based on the first prediction or the second prediction. The prediction has a confidence value based on the first weight and second weight. The prediction corresponds to the first prediction and second prediction. For example, the prediction is presence if the first prediction and second prediction predict presence. The confidence value is a weighted average based on the first weight, first confidence value, second weight, and second value. Operation 2014 follows operation 2008.

In an example, the flow includes operation 2010, where the computer system selects between the first prediction and the second prediction. The computer system selects the prediction with the higher confidence value. The computer system may alternatively select the prediction with a higher value after weighing the corresponding confidence value with the relevant weight. To weigh the confidence value with the weight, the computer system may multiply the confidence value by the relevant weight.

In an example, the flow includes operation 2012, where the computer system generates a prediction based on the selected prediction. For example, the computer system generates the prediction of presence as being the first prediction if selected or on the second prediction if selected. The selected prediction has a confidence value, where this value can be weighted based on the weight of the selected prediction.

In an example, the flow includes operation 2014, where the computer system determines whether the confidence value is greater than a threshold. As indicated above, the confidence value can be weighted. The computer system compares the confidence value of the prediction to the threshold to determine whether the confidence value is greater than the threshold. If so, operation 2016 follows operation 2014. If not, the flow loops back to operation 2002.

In an example, the flow includes operation 2016, where the computer system outputs the prediction. The computer system can output the prediction to any devices connected to the computer network. For example, the computer system can output the prediction to a user device (e.g., the user device 1640 in FIG. 16) causing the user device to output a presence or no presence notification. The computer system may also output the prediction to a security system (e.g., the security system 1650 of FIG. 16) to cause the security system to arm or disarm.

Figure 21:
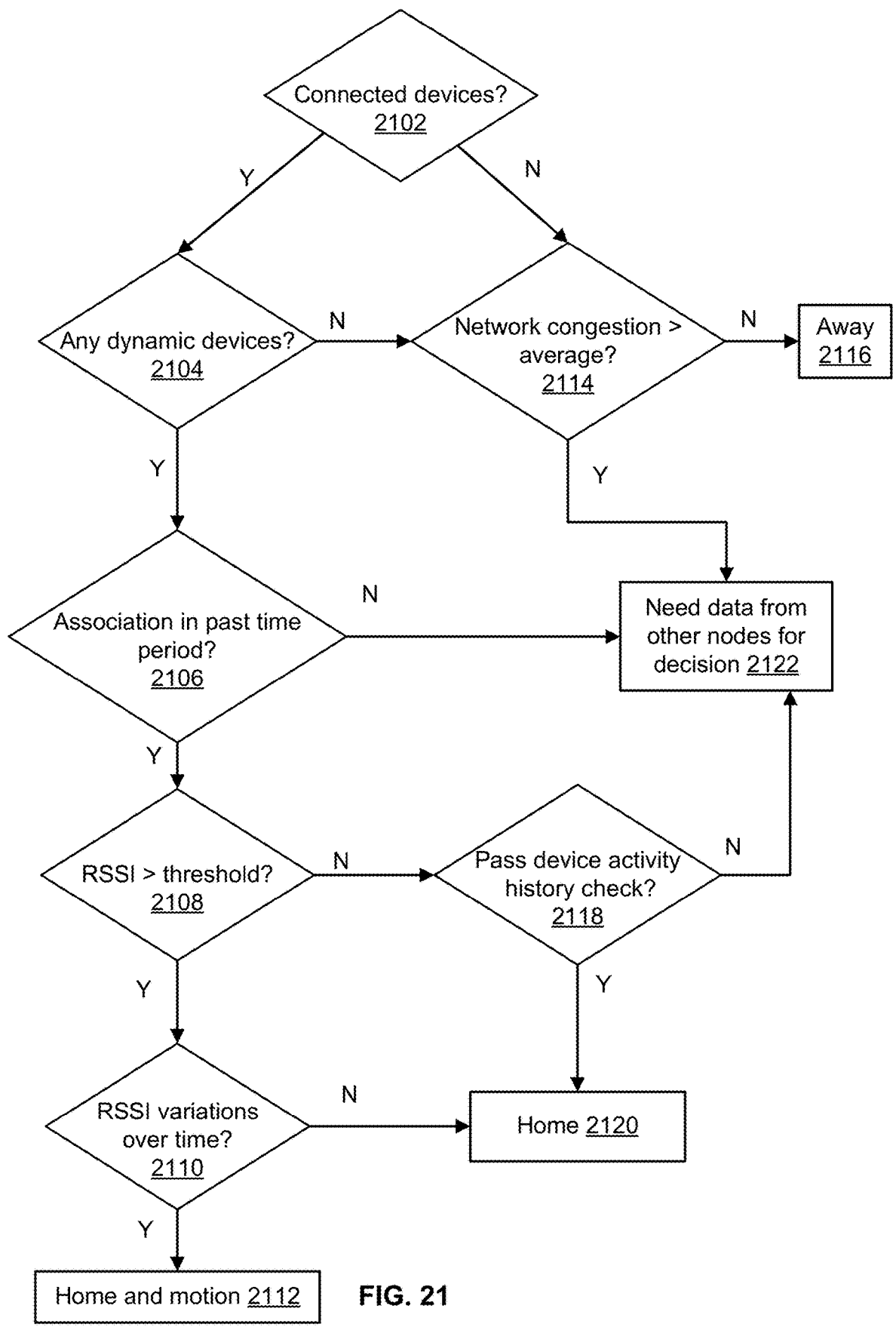
FIG. 21 illustrates an example of a flow of performing presence detection per node using a metrics-based model, according to embodiments of the present disclosure.

FIG. 21 illustrates an example of a flow of performing presence detection per node using a metrics-based model, according to embodiments of the present disclosure. Operations of the flow can be performed by a metrics processor of a computer system, such as metrics processor 1720, that is connected to a computer network at a location. A node of the computer network can be any device, whether static or dynamic, connected to the computer network at the location. Predictions of "home" and "home and motion" correspond to presence at the location and a prediction of "away" corresponds to no presence at the location. The metrics processor can repeat the flow of FIG. 12 for each node (e.g., device) connected to the computer network and perform additional operations to generate a decision about presence at the location.

In an example, the flow includes operation 2102, where the metrics processor determines whether there are connected devices. The metrics processor determines whether there are static or dynamic devices connected to the computer network. The metrics processor uses network parameter data indicating a number of devices connected to the computer network to make the determination.

In an example, the flow includes operation 2104, where the metrics processor determines whether there are any dynamic devices. The metrics processor uses network parameter data indicating the types of devices that are connected to the computer network to make the determination. The flow continues to operation 2106 if there are dynamic devices. If not, the flow continues to operation 2114.

In an example, the flow includes operation 2106, where the metrics processor determines whether there has been association in a past predefined period of time (e.g., the past sixteen hours). The network parameter data includes association information for the computer network. The metrics processor analyzes the network parameter data over the predefined time period to determine whether any dynamic devices have associated with the network (e.g., with any static device thereof) during the past predefined time period. If dynamic devices have associated in the past predefined time period, the flow continues to operation 2108. If not, the flow proceeds to operation 2122.

In an example, the flow includes operation 2108, where the metrics processor determines whether the RSSI value is greater than a threshold. The metrics processor compares an RSSI value received in network parameter data to the threshold. The RSSI value being greater than the threshold can indicate presence at the location. The flow continues to operation 2108 based on the metrics processor determining the RSSI is greater than the threshold. If not, the flow proceeds to operation 2118.

In an example, the flow includes operation 2110, where the metrics processor determines whether there are RSSI variations over time. The network parameter data indicates RSSI values over time. The metrics processor analyzes the network parameter data to determine whether there are variations over time. The metrics processor can analyze a predefined amount of time (e.g., last five minutes) to make the determination. If there are RSSI variations over time, the flow continues to operation 2110. If not, the flow proceeds to operation 2120, where the metrics processor determines a prediction of home.

In an example, the flow includes operation 2112, where the metrics processor determines a prediction of "home and motion." The combination of the RSSI value being greater than the threshold and RSSI values varying over time indicate there is presence and motion at the location. As a result, the metrics processor generates the prediction of "home and motion."

In an example, the flow includes operation 2114, where the metrics processor determines whether network congestion is greater than average. Link parameter data includes information about network congestion. The metrics processor compares the current network congestion to an average network congestion over a predefined amount of time (e.g., the last hour). If the network congestion is greater than average, the flow proceeds to operation 2122. If not, the flow continues to operation 2116.

In an example, the flow includes operation 2116, where the metrics processor determines a prediction of "away" (e.g. no presence). The combination of determining there are not any connected devices and the network congestion is below average leads the metrics processor to generate the prediction of "away."

In an example, the flow includes operation 2118, where the metrics processor determines whether the device passes a device activity history check. The device history check can include analyzing previous network parameter data, link parameter data, or presence predictions. For example, the metrics processor can determine the values of network parameter data correspond to average values for the network parameter data. Additionally, the metrics processor can determine that it is nighttime and the presence prediction is typically home for the night. The flow continues to operation 2120 based on the device passing the device activity history check. If not, the flow proceeds to operation 2122.

In an example, the flow includes operation 2120, where the metrics processor determines a prediction of "home." The prediction of home corresponds to a prediction of presence at the location.

In an example, the flow includes operation 2122, where the metrics processor determines data from other nodes is needed for a decision. Lack of association of dynamic devices in the past predefined time period, network congestion higher than average, and the device not passing the device history check can result in the metrics processor determining additional data is needed.

Figure 22:
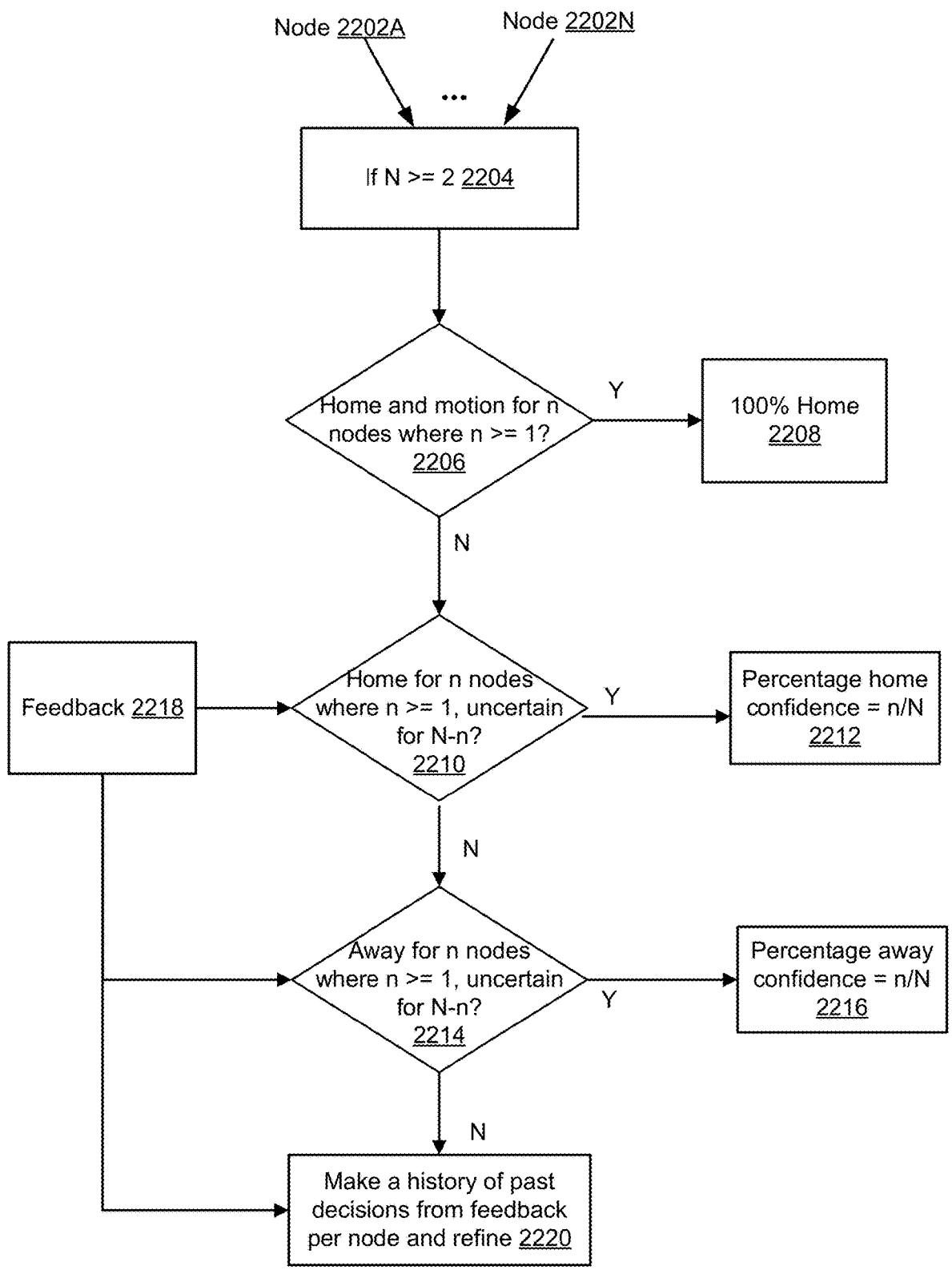
FIG. 22 illustrates an example of a flow of a flow of determining presence for multiple nodes using a metrics-based model, according to embodiments of the present disclosure.

FIG. 22 illustrates an example of a flow of a flow of determining presence for multiple nodes using a metrics-based model, according to embodiments of the present disclosure. Operations of the flow can be performed by a metrics processor of a computer system, such as metrics processor 1720, that is connected to a computer network at a location.

In an example, the flow includes operation 2204, where the metrics processor receives input from multiple nodes 2202A through 2202N (for a total of "N" nodes), each of which can be a static device or a dynamic device of the computer network. The inputs are the determined presence predictions per node, where these predictions can be generated per the flow of FIG. 21.

In an example, the flow includes operation 2206, where the metrics processor determines whether the predictions include "home and motion" for one or more nodes. The metrics processor analyzes the inputs from nodes 2202A through 2202N to determine whether one or more of the predictions is for "home and motion." If so, the flow continues to operation 1208, where the metrics processor determines a prediction of home with a one-hundred percent confidence. If not, the flow proceeds to operation 2210.

In an example, the flow includes operation 2210, where the metrics processor determines whether the predictions predict "home" for one or more nodes. The metrics processor analyzes the inputs from nodes 2202A through 2202N to determine whether one or more of the predictions is for "home." Not all of the nodes 2202A through 2202N may be associated with data that resulted in the same prediction of "home." For instance, some of the nodes 2202A through 2202N may have resulted in an "away" prediction or that more data is needed. Thus, there may be an uncertainty about outputting a collective prediction of "home," where the uncertainty can relate to nodes for which predictions of "away" or the need for more data made. The confidence level of the "home" prediction can be a function of this uncertainty. For instance, "n" is the number of nodes 2202A through 2202N for which the prediction is "home," "N" is the total number of devices of the home network, and "N-n" is the number of devices for which uncertainty exists. The confidence value is a ratio of the number "n" over the number "N." For example, a total number of ten nodes with four providing home predictions results in an uncertain prediction for six nodes and confidence value of forty percent. If the predictions predict home for one or more nodes, the flow continues to operation 2212. If not, the flow proceeds to operation 2214.

In an example, the flow includes operation 2212, where the metrics processor determines a percentage home confidence. The percentage home confidence corresponds to a ratio of the number of nodes with home predictions to the total number of nodes. For example, a total of ten nodes with four nodes providing home predictions results in a percentage home confidence of forty percent.

In an example, the flow includes operation 2214, where the metrics processor determines the predictions of "away" for one or more nodes. The metrics processor analyzes the inputs from nodes 2202A through 2202N to determine whether one or more of the predictions is for away. Here, also uncertainty exists. The uncertainty corresponds to the total number of nodes "N" minus the number of nodes "n" providing away predictions. For example, a total number of ten nodes with four providing away predictions results in an uncertain prediction for six nodes. The flow continues to operation 2216 if one or more nodes predict away. If not, the flow proceeds to operation 2220.

In an example, the flow includes operation 2216, where the metrics processor determines a percentage away confidence. The percentage away confidence corresponds to a confidence that there is no presence at the location. The percentage away confidence is a ratio of the number of nodes "n" providing an away prediction to the total number of nodes "N."

In an example, the flow includes operation 2218, where the metrics processor inputs feedback to operations 2210, 2214, and 2218. The feedback can include information about nodes that provide incorrect predictions. The feedback can be used to set a feature (e.g., flag) for the metrics processor. Based on the feedback, the metrics processor can ignore the predictions generated based on data associated with those nodes.

In an example, the flow includes operation 2220, where the metrics processor makes a history of past decisions from feedback per node and refines the prediction. The history can include node predictions that were accurate for past decisions. The history can also include nodes that inaccurately predicted presence. Making the history can include adding the past decisions as ground truth labels to a training dataset.

Figure 23:
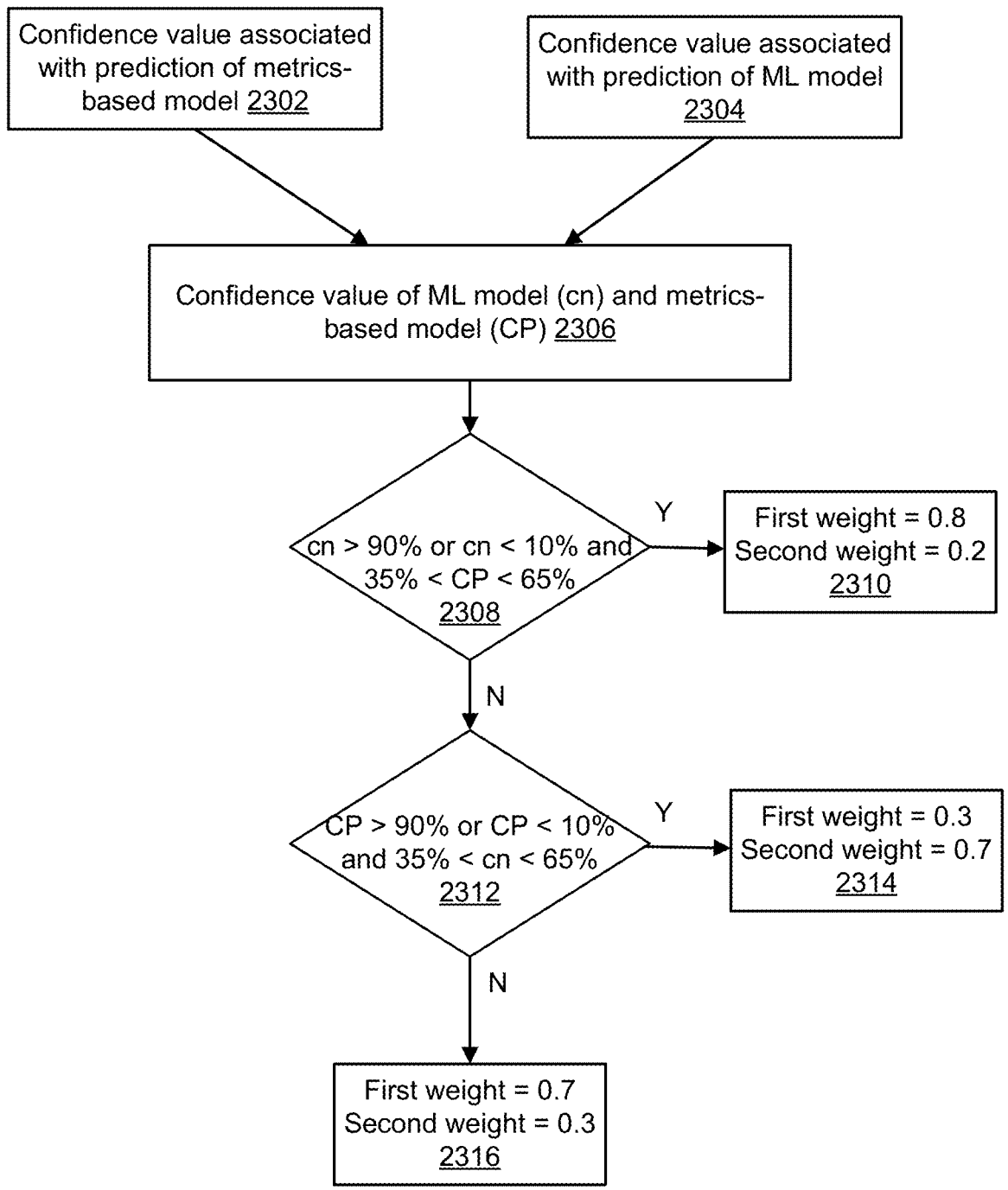
FIG. 23 illustrates an example of a flow of determining weights of confidence values of predictions that are output from prediction models, according to embodiments of the present disclosure.

FIG. 23 illustrates an example of a flow of determining weights of confidence values of predictions that are output from prediction models, according to embodiments of the present disclosure. Operations of the flow can be performed by a computer system connected to a computer network at a location.

In an example, the flow includes operation 2302, where the computer system determines a confidence value associated with a prediction of a metrics-based model. The metrics-based model processes network parameter data to output the prediction and the confidence value of this prediction. In an example, the network parameter data is received per device of the computer network. This data is input to the metrics-based model to output a presence prediction per device. The presence predictions may be determined for the different device of the computer network. A final presence prediction and a confidence level associated therewith may be generated from the different presence predictions according to the flow of FIG. 22. The final presence prediction and the associated confidence value are output to a decision engine of the computer system.

In an example, the flow includes operation 2304, where the computer system determines a confidence value associated with a prediction of a ML model. The ML model processes link parameter data about nodes, whether static devices or dynamic devices, of the computer network to output the presence prediction and confidence value of this prediction. The presence prediction and confidence value are output to the decision engine.

In an example, the flow includes operation 2306, where the computer system determines the confidence from the ML model (shown in FIG. 23 as "cn") and confidence level based on the metrics-based model (shown in FIG. 23 as "CP"). For example, the decision engine receives the outputs of the ML model and the metrics-model, where the outputs include the confidence values.

In an example, the flow includes operation 2308, where the computer system determines whether the confidence value determined by the ML model and the confidence value determined by the metrics-base model fit a first criteria. For example, the first criteria may specify that the confidence value determined by the ML model is either greater than ninety percent or less than ten percent and that the confidence value determined by the metrics-based model is between thirty-five percent and sixty-five percent. It is to be noted what the above percentage values are merely examples of what a criterial may include. A person skilled in the art would recognize that any other suitable criteria may be used based on a specific design and/or a particular use case. Further, other objective/numerical values besides use of percentages are possible. In the above example, for the first criteria to be satisfied, the confidence value determined by the ML model has to be either greater than 90% or less than 10% and the confidence value determined by the metrics-based model is between 35% and 65%. If any of the above is not true, the first criteria is considered as unsatisfied. If the first criteria is satisfied, the flow continues to operation 2310. If not, the flow proceeds to operation 2312.

In an example, the flow includes operation 2310, where the computer system determines a first weight and a second weight. The first weight is 0.8 and corresponds to a weight to be used for the presence prediction of the ML model. The second weight is 0.2 and corresponds to a weight to be used for presence prediction of the metrics-based model. Other weight values are likewise possible.

In an example, the flow includes operation 2312, where the computer system determines whether the confidence value determined by the ML model and the confidence determined by the metrics-based model fit second criteria. The second criteria include the confidence of the metrics-based model being greater than ninety percent or less than ten percent and the confidence of the ML model being between thirty-five percent and sixty-five percent (or some other threshold values). The flow continues to operation 2314 if the second criteria is satisfied. If not, the flow proceeds to operation 2316.

In an example, the flow includes operation 2314, where the computer system determines a first weight and a second weight. The first weight is 0.3 and corresponds to a weight to be used for the presence predictions of the ML model. The second weight is 0.7 and corresponds to a weight to be used for the presence predictions of the metrics-based model. Other weight values are likewise possible.

In an example, the flow includes operation 2316, where the computer system determines a first weight and a second weight. The first weight is 0.7 and corresponds to a weight to be used for presence predictions of the ML model. The second weight is 0.3 and corresponds to a weight to be used for presence predictions of the metrics-based model. Other weight values are likewise possible.

The first weight and second weight determined in operation 2310, 2314, or 2316 are usable in determining a presence decision for the location. The confidence values determined by the metrics-based model and ML model can be weighed with the corresponding weight to determine whether there is presence at the location or not. For instance, the confidence value determined by the ML model is ninety-five percent of the presence being detected and the confidence value determined by the metrics-based model is fifty percent of the presence being detected. Accordingly, the first criteria are met. The first weight of the ML model's presence prediction is set to 0.8, whereas the weight of the metrics-based model's presence prediction is set to 0.2. In this illustrative example, the confidence value determined by the ML model is adjusted from ninety-five percent to 0.95×0.8=0.76 (or seventy-six percent). Similarly, the weight of the confidence value determined by the metrics-based model is adjusted from fifty percent to 0.5×0.2=0.1 (or ten percent). The two adjusted confidence values are combined, resulting in an overall confidence value of 0.86 (or eighty-six percent) of the presence being detected. This overall confidence value is compared to a threshold value (e.g., sixty-five percent). Because the confidence value exceeds this threshold value, a determination is made that the presence is detected.

Figure 24:
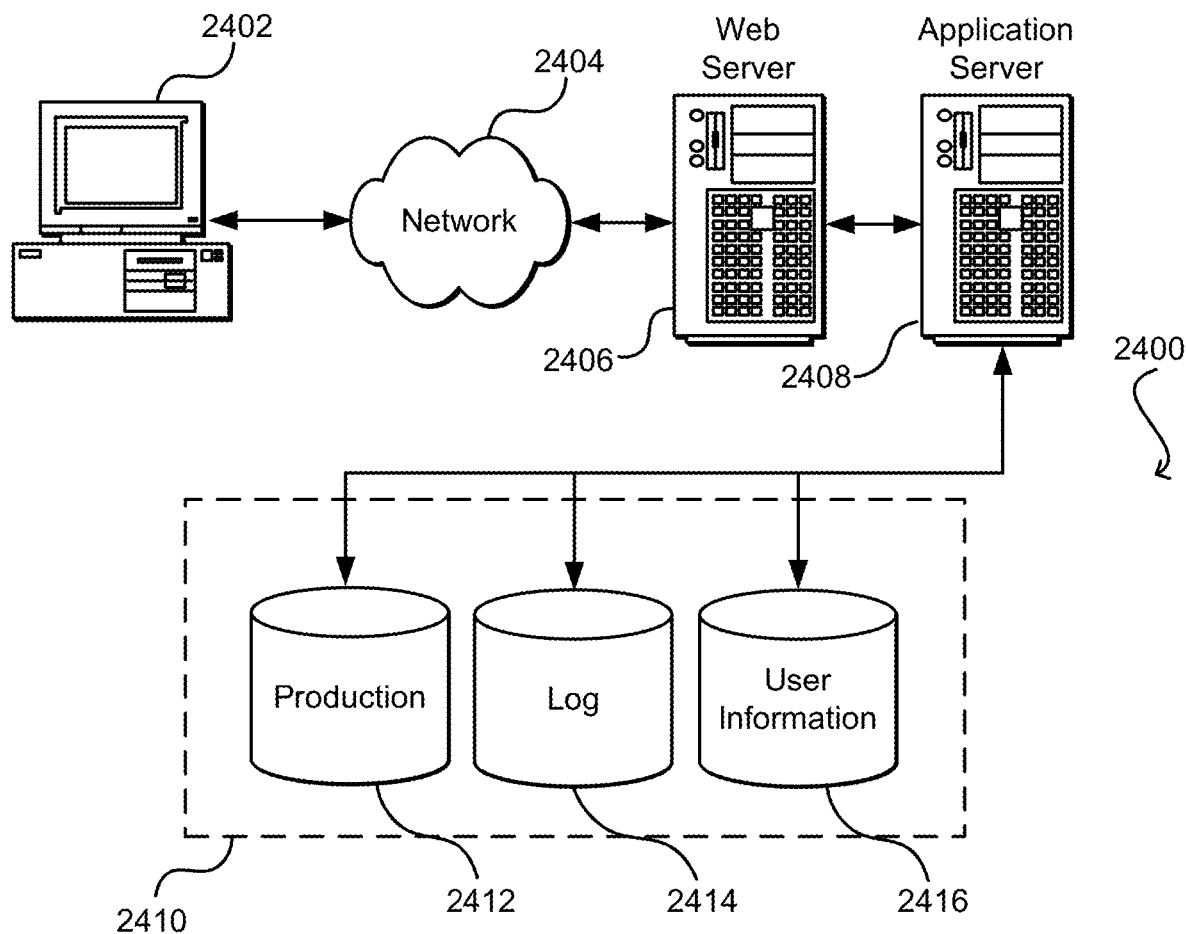
FIG. 24 illustrates an environment in which various embodiments can be implemented.

FIG. 24 illustrates aspects of an example environment 2400 for implementing aspects in accordance with various embodiments. As will be appreciated, although a Web-based environment is used for purposes of explanation, different environments may be used, as appropriate, to implement various embodiments. The environment includes an electronic client device 2402, which can include any appropriate device operable to send and receive requests, messages, or information over an appropriate network 2404 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 2406 for receiving requests and serving content in response thereto, although for other networks an alternative device serving a similar purpose could be used as would be apparent to one of ordinary skill in the art.

The illustrative environment includes at least one application server 2408 and a data store 2410. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 2402 and the application server 2408, can be handled by the Web server. It should be understood that the Web and application servers are not required and are merely example components, as structured code discussed herein can be executed on any appropriate device or host machine as discussed elsewhere herein.

The data store 2410 can include several separate data tables, databases or other data storage mechanisms and media for storing data relating to a particular aspect. For example, the data store illustrated includes mechanisms for storing production data 2412 and user information 2416, which can be used to serve content for the production side. The data store also is shown to include a mechanism for storing log data 2414, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 2410. The data store 2410 is operable, through logic associated therewith, to receive instructions from the application server 2408 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 2402. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 24. Thus, the depiction of the system 2400 in FIG. 24 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A first device comprising:
   one or more processors; and
   one or more memory storing instructions that, upon execution by the one or more processors, configure the first device to:
      transmit, to a second device, first data over a link between the first device and the second device;
      determine that a value of a link parameter of the link is within a range of values;
      determine, from a plurality of configurations associated with channel state information (CSI) data transmission, a configuration based at least in part on the value, the configuration including at least one of: a transmission rate, a transmission bandwidth, or a number of transmit antennas; and
      transmit, to the second device and based at least in part on the configuration, first CSI data over the link.

2. The first device of claim 1, wherein the first CSI data is transmitted at a first time based at least in part on a first transmission rate, and wherein the one or more memory store instructions that, upon execution by the one or more processors, configure the first device to:
   determine a change to the link parameter;
   determine a second transmission rate based at least in part on the change; and
   transmit, at a second time, second CSI data over the link based at least in part on the second transmission rate.

3. The first device of claim 1, wherein the first CSI data is transmitted at a first time based at least in part on a first bandwidth value, and wherein the one or more memory store instructions that, upon execution by the one or more processors, configure the first device to:
   determine a change to the link parameter;
   determine a second bandwidth value based at least in part on the change; and
   transmit, at a second time, second CSI data over the link based at least in part on the second bandwidth value.

4. The first device of claim 1, wherein the first CSI data is transmitted at a first time by at least using a first transmit antenna, and wherein the one or more memory store instructions that, upon execution by the one or more processors, configure the first device to:
   determine a change to the link parameter; and
   transmit, at a second time, second CSI data using the first transmit antenna and third CSI data using a second transmit antenna.

5. The first device of claim 1, wherein the one or more memory store instructions that, upon execution by the one or more processors, configure the first device to:
   determine, for each one of a plurality of links established with the second device, a corresponding configuration, wherein the configuration associated with the link is different from a second configuration associated with a second link of the plurality of links; and
   send, to the second device, second CSI data over the second link based at least in part on the second configuration.

6. The first device of claim 1, wherein the one or more memory store instructions that, upon execution by the one or more processors, configure the first device to:
   determine, after the first CSI data is transmitted, that the link is disconnected;
   select a second link of a plurality of links established with the second device;
   determine a second configuration for the second link; and
   transmit, to the second device over the second link, second CSI data based at least in part on the second configuration.

7. The first device of claim 1, wherein the one or more memories store further instructions that, upon execution by at least one of the one or more processors, configure the first device to:
   determine, for each one of a plurality of links established by the first device, a corresponding configuration; and
   transmit, over each one of the plurality of links, corresponding CSI data based at least in part on second data instructing the first device about CSI data transmissions over all of the plurality of links.

8. A method implemented by a first device, the method comprising:
   transmitting, to a second device, first data over a link between the first device and the second device;
   determining that a value of a link parameter of the link is within a range of values;
   determining, from a plurality of configurations associated with channel state information (CSI) data transmission, a configuration based at least in part on the value, the configuration including at least one of: a transmission rate, a transmission bandwidth, or a number of transmit antennas; and
   transmitting, to the second device and based at least in part on the configuration, first CSI data over the link.

9. The method of claim 8, wherein the value of the link parameter is a first value determined at a first time, and wherein the method further comprises:
   determining, at a second time a second value of the link parameter;
   determining that the second value is within a second range of values;
   determining, from the plurality of configurations, a second configuration associated with the second range of values; and
   transmitting, to the second device and based at least in part on the second configuration, second CSI data over the link.

10. The method of claim 8, further comprising:
    receiving, from a server, second data indicating the range of values, the configuration, and association information between the range of values and the configuration, and wherein the configuration is determined further based at least in part on the association information.

11. The method of claim 8, further comprising:
determining that a second value of a second link parameter of the link is within a second range of values; and
determining, from the plurality of configurations, a second configuration based at least in part on the second value, wherein the first CSI data is transmitted further based at least in part on the second configuration.

12. The method of claim 8, wherein determining the configuration further comprises:
determining that a second value of a second link parameter of the link is within a second range of values associated with the second link parameter;
determining, from the plurality of configurations, a second configuration based at least in part on the second value;
determining that the link parameter has a higher priority than the second link parameter; and
selecting the configuration instead of the second configuration based at least in part on the higher priority of the link parameter.

13. The method of claim 8, further comprising:
receiving, from a server, a request to report congestion metrics associated with the link;
sending, to the server, second data that includes the congestion metrics; and
receiving, from the server, third data indicating, for each link of a plurality of links established by the first device with one or more other devices, at least: (i) a corresponding range of link parameter values and (ii) a corresponding configuration associated with the corresponding range of link parameter values.

14. One or more non-transitory computer-readable storage media storing instructions that, upon execution on a first device, cause the first device to perform operations comprising:
transmitting, to a second device, first data over a link between the first device and the second device;
determining that a value of a link parameter of the link is within a range of values;
determining, from a plurality of configurations associated with channel state information (CSI) data transmission, a configuration based at least in part on the value, the configuration including at least one of: a transmission rate, a transmission bandwidth, or a number of transmit antennas; and
transmitting, to the second device and based at least in part on the configuration, first CSI data over the link.

15. The one or more non-transitory computer-readable storage media of claim 14, wherein the value of the link parameter is determined to be within the range of values by at least comparing the value to a first plurality of potential values of the link parameter included in the range of values.

16. The one or more non-transitory computer-readable storage media of claim 15, wherein the value of the link parameter is determined to be within the range of values by at least further comparing the value to a second plurality of potential values of the link parameter included in a second range of values, wherein the second range of values is associated with a second configuration of the plurality of configurations.

17. The one or more non-transitory computer-readable storage media of claim 14, wherein the configuration is determined based at least in part on second data indicating an association between the configuration and the range of values, wherein the second data associates each one of the plurality of configurations with a different range of values of the link parameter.

18. The one or more non-transitory computer-readable storage media of claim 14 storing further instructions that, upon execution on the first device, cause the first device to perform further operations comprising:
determining one or more physical layer parameters associated with the link, wherein the one or more physical layer parameters comprise at least one of: a data error rate (PER), a physical layer (PHY) rate, or a received signal strength indicator (RSSI); and
selecting the link from a plurality of links established with the second device, wherein the first CSI data is transmitted over the link based at least in part on the link being selected.

19. The one or more non-transitory computer-readable storage media of claim 18 storing additional instructions that, upon execution on the first device, cause the first device to perform additional operations comprising:
determining that the link has a lower PER than a second link of the plurality of links; and
determining that the lower PER has a higher priority than the PHY rate, wherein the link is selected based at least in part on the lower PER and the higher priority.

20. The one or more non-transitory computer-readable storage media of claim 18 storing additional instructions that, upon execution on the first device, cause the first device to perform additional operations comprising:
determining a first PER of the link and a second PER of a second link of the plurality of links;
determining that a PER difference between the first PER and the second PER is within the range of values;
determining a first PHY rate of the link and a second PHY rate of the second link; and
determining that a PHY rate difference between the first PHY rate and the second PHY rate is outside of a second range of values, wherein the link is selected based at least in part on the PER difference and the PHY rate difference.

* * * * *